US012608671B2

(12) United States Patent
Green et al.

(10) Patent No.: US 12,608,671 B2
(45) Date of Patent: Apr. 21, 2026

(54) METHODS AND SYSTEMS FOR AUTOMATICALLY EVALUATING ORGANIZATIONAL STRUCTURES AND BUSINESS PROCESS DOCUMENTATION FOR COMPLIANCE WITH RELEVANT STANDARDS, REQUIREMENTS, AND POLICIES

(71) Applicant: Charter Communications Operating, LLC, St. Louis, MO (US)

(72) Inventors: Michael S. Green, St. Charles, MO (US); Neelima Mumgandi, St. Peters, MO (US); Steven Michael Koch, II, Cedar Hill, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 3 days.

(21) Appl. No.: 18/671,346

(22) Filed: May 22, 2024

(65) Prior Publication Data

US 2025/0363440 A1 Nov. 27, 2025

(51) Int. Cl.
*G06Q 10/0639* (2023.01)
*G06Q 10/0637* (2023.01)

(52) U.S. Cl.
CPC . *G06Q 10/06395* (2013.01); *G06Q 10/06375* (2013.01); *G06Q 10/06393* (2013.01)

(58) Field of Classification Search
CPC ....... G06Q 10/06395; G06Q 10/06375; G06Q 10/06393
See application file for complete search history.

(56) References Cited

U.S. PATENT DOCUMENTS 12,217,271 B1 * 2/2025 Sardanopoli ......... G06Q 30/018
12,259,913 B1 3/2025 Muschett et al.
(Continued)

FOREIGN PATENT DOCUMENTS

AU 2006100413 A8 * 6/2006

OTHER PUBLICATIONS

Talasen et al. "Applying Large Language Models in Business Processes" (2024) (http://www.diva-portal.org/smash/get/diva2:1870479/FULLTEXT01.pdf) (Year: 2024).*

*Primary Examiner* — Sujay Koneru
(74) *Attorney, Agent, or Firm* — The Marbury Law Group, PLLC

(57) ABSTRACT

Various embodiments include methods and systems for automatically evaluating organizational structures and/or business process documentation for compliance with relevant standards, requirements, and policies. Various embodiment methods may include transforming input requests for analysis and organizational structures and/or business process documents into formats suitable for processing by a large language model (LLM), prompting the LLM to identify concepts and/or elements that are likely subject to a standard, requirement, or policy, submitting a query to a compliance criteria vector database to identify standards, requirements, or policies relevant to the requested analysis and documents, prompting the LLM to determine whether the organizational structures and/or business process documents comply with each relevant standard, requirement, or policy, and producing a report from LLM outputs on compliance of the organizational structures and/or business process documents with each of the relevant standards, requirements, or policies.

22 Claims, 6 Drawing Sheets

(56) References Cited

U.S. PATENT DOCUMENTS

| | | | | |
|---|---|---|---|---|
| 2004/0010709 A1* | 1/2004 | Baudoin | G06Q 40/08 | |
| | | | | 726/1 |
| 2005/0010456 A1* | 1/2005 | Chang | G06Q 10/0639 | |
| | | | | 705/7.38 |
| 2005/0065839 A1* | 3/2005 | Benson | G06Q 40/02 | |
| | | | | 705/35 |
| 2008/0091676 A1* | 4/2008 | Zwilling | G06Q 10/06395 | |
| 2009/0113324 A1* | 4/2009 | Spradling | G06Q 40/12 | |
| | | | | 715/764 |
| 2011/0145885 A1* | 6/2011 | Rivers | G06Q 10/06 | |
| | | | | 726/1 |
| 2011/0191145 A1* | 8/2011 | Ford | G06Q 30/018 | |
| | | | | 705/317 |
| 2012/0323639 A1* | 12/2012 | Sabharwal | G06Q 10/067 | |
| | | | | 705/7.38 |
| 2015/0006235 A1* | 1/2015 | Jandhyala | G06Q 10/06316 | |
| | | | | 705/7.26 |
| 2019/0114370 A1* | 4/2019 | Cerino | G06F 40/14 | |
| 2019/0347586 A1* | 11/2019 | Kaulgud | G06Q 10/06393 | |
| 2020/0311631 A1* | 10/2020 | Hecht | G06Q 10/063114 | |
| 2022/0108069 A1* | 4/2022 | Lee | G06N 20/00 | |
| 2023/0252233 A1* | 8/2023 | Gutierrez | G06F 40/40 | |
| | | | | 704/9 |
| 2024/0127617 A1* | 4/2024 | Amamou | G06V 30/19133 | |
| 2024/0212080 A1* | 6/2024 | Dorodchi | G06Q 50/2053 | |
| 2024/0354436 A1* | 10/2024 | Mukherjee | G06F 16/3344 | |
| 2024/0370432 A1 | 11/2024 | Devaux et al. | | |
| 2024/0386204 A1* | 11/2024 | Sangarapillai | G06F 16/26 | |
| 2024/0420161 A1* | 12/2024 | Shah | G06Q 10/0635 | |
| 2025/0006201 A1* | 1/2025 | Adlersberg | G10L 17/22 | |
| 2025/0007870 A1 | 1/2025 | Kim et al. | | |
| 2025/0021547 A1 | 1/2025 | Lewis et al. | | |
| 2025/0045256 A1* | 2/2025 | Gottlob | G06F 16/2365 | |
| 2025/0069617 A1 | 2/2025 | Carbune et al. | | |
| 2025/0071202 A1* | 2/2025 | Daya | H04M 3/5175 | |
| 2025/0094390 A1 | 3/2025 | Hettige et al. | | |
| 2025/0111152 A1 | 4/2025 | Sinha et al. | | |
| 2025/0111192 A1 | 4/2025 | Bayless et al. | | |
| 2025/0117630 A1 | 4/2025 | Taheri | | |
| 2025/0265526 A1* | 8/2025 | Cowan | G06Q 10/0637 | |

* cited by examiner

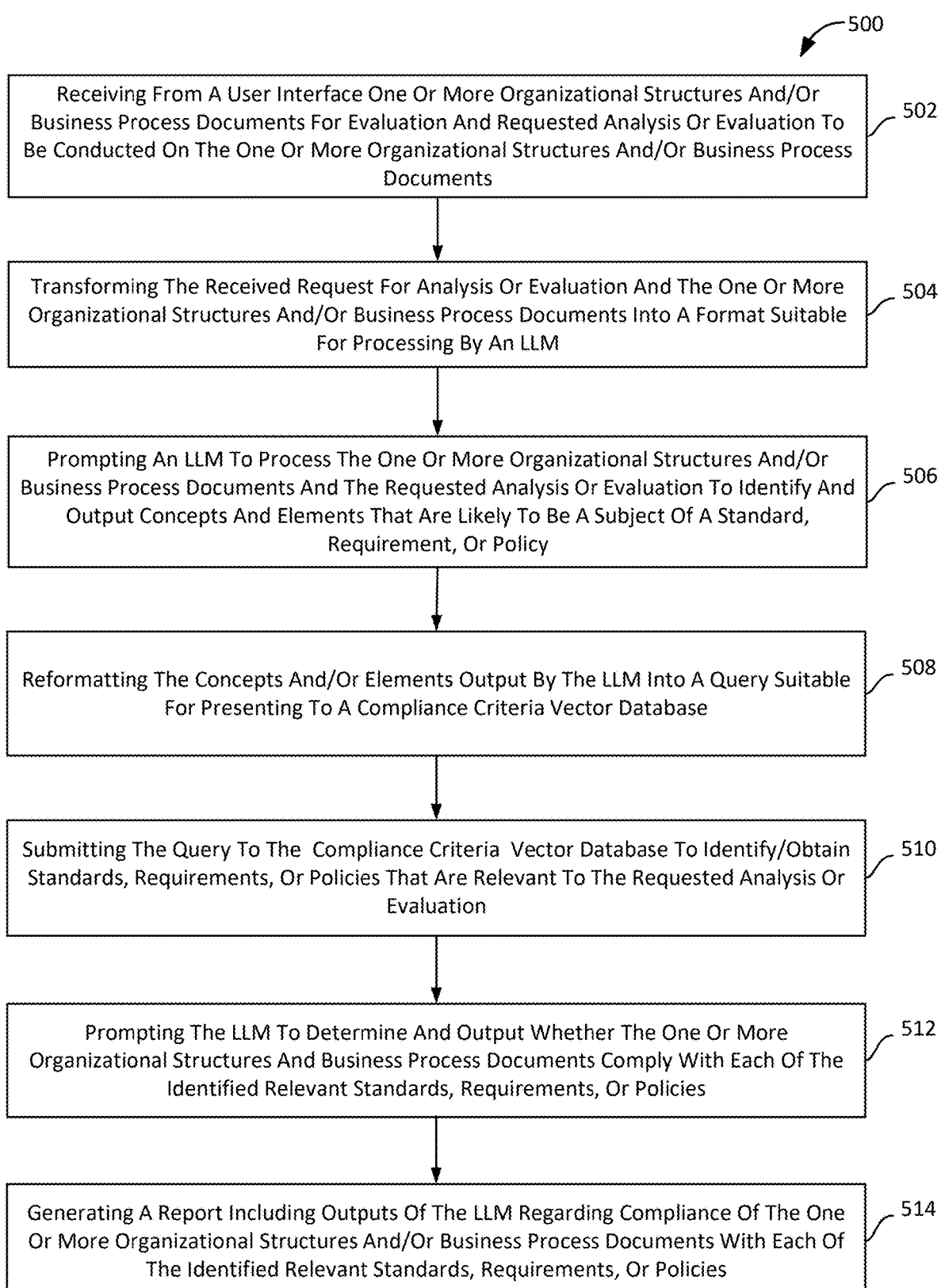

500

Receiving From A User Interface One Or More Organizational Structures And/Or Business Process Documents For Evaluation And Requested Analysis Or Evaluation To Be Conducted On The One Or More Organizational Structures And/Or Business Process Documents — 502

Transforming The Received Request For Analysis Or Evaluation And The One Or More Organizational Structures And/Or Business Process Documents Into A Format Suitable For Processing By An LLM — 504

Prompting An LLM To Process The One Or More Organizational Structures And/Or Business Process Documents And The Requested Analysis Or Evaluation To Identify And Output Concepts And Elements That Are Likely To Be A Subject Of A Standard, Requirement, Or Policy — 506

Reformatting The Concepts And/Or Elements Output By The LLM Into A Query Suitable For Presenting To A Compliance Criteria Vector Database — 508

Submitting The Query To The  Compliance Criteria  Vector Database To Identify/Obtain Standards, Requirements, Or Policies That Are Relevant To The Requested Analysis Or Evaluation — 510

Prompting The LLM To Determine And Output Whether The One Or More Organizational Structures And Business Process Documents Comply With Each Of The Identified Relevant Standards, Requirements, Or Policies — 512

Generating A Report Including Outputs Of The LLM Regarding Compliance Of The One Or More Organizational Structures And/Or Business Process Documents With Each Of The Identified Relevant Standards, Requirements, Or Policies — 514

FIG. 5

METHODS AND SYSTEMS FOR AUTOMATICALLY EVALUATING ORGANIZATIONAL STRUCTURES AND BUSINESS PROCESS DOCUMENTATION FOR COMPLIANCE WITH RELEVANT STANDARDS, REQUIREMENTS, AND POLICIES

BACKGROUND

An important step in the design and development of organizational structures and business processes involves confirming compliance of drafted organizational structure and business process documentation with a variety of government, industry, client and/or company standards and requirements. While much has been written on the innovation process and a growing number of software and artificial intelligence (AI) tools are available for implementing innovations in code, designs, and business plans, the processes of reviewing the resulting documentation for compliance with relevant standards, requirements and governing policies remains a time consuming process involving people from multiple disciplines to complete.

SUMMARY

Various aspects include methods and systems for automatically evaluating organizational structures and/or business process documentation for compliance with relevant standards, requirements, and policies. Various embodiments include receiving from a user interface one or more organizational structures and/or business process documents for evaluation and requested analysis or evaluation to be conducted on the one or more organizational structures and/or business process documents, transforming the received request for analysis or evaluation and the one or more organizational structures and/or business process documents into a format suitable for processing by a large language model (LLM), and prompting an LLM to process the one or more organizational structures and/or business process documents and the requested analysis or evaluation to identify (e.g., infer and output) concepts and/or elements that are likely to be a subject of a standard, requirement, or policy. Various aspects further include reformatting the concepts and/or elements identified by the first LLM into a query format suitable for presenting to an organizational structures and/or business process standards, requirements, and policies compliance criteria vector database, and submitting the query to the organizational structures and/or business process standards, requirements, and policies compliance criteria vector database to identify standards, requirements, or policies that are relevant to the requested analysis or evaluation. Various aspects further include prompting the LLM to determine (e.g., infer and output) whether the one or more organizational structures and/or business process documents comply with each of the identified relevant standards, requirements, or policies, and generating and outputting a report comprising outputs of the LLM regarding compliance of the one or more organizational structures and/or business process documents with each of the identified relevant standards, requirements, or policies.

In some aspects, transforming the received request for analysis or evaluation and the one or more organizational structures and/or business process documents into a format suitable for processing by a LLM comprises translating organizational structures and/or business process terminology and acronyms into natural language understandable by the LLM.

In some aspects, prompting an LLM to process the one or more organizational structures and/or business process documents and the requested analysis or evaluation to identify (e.g., infer and output) concepts and/or elements that are likely to be a subject of a standard, requirement or policy comprises prompting a first LLM that is trained to analyze organizational structures and/or business process documentation and the requested analysis or evaluation to identify organizational structures and/or business process concepts and/or elements that that are likely to be a subject of a standard, requirement or policy, and prompting the LLM to determine (e.g., infer and output) whether the one or more organizational structures and/or business process documents comply with each of the identified relevant standards, requirements, or policies comprises prompting a second LLM that is trained to compare organizational structures and/or business process documentation to organizational structures and/or business process standards, requirements, and policies to identify compliance and non-compliance.

In some aspects, prompting the LLM to determine (e.g., infer and output) whether the one or more organizational structures and/or business process documents comply with each of the identified relevant standards, requirements, or policies comprises prompting the LLM to output text identifying aspects of the one or more organizational structures and/or business process documents that comply with the identified relevant standards, requirements, or policies, and output text identifying non-compliant aspects of the one or more organizational structures and/or business process documents along with recommended changes to comply with the identified relevant standards, requirements, or policies.

In some aspects, reformatting the concepts and/or elements identified by the LLM into a query suitable for presenting to an organizational structures and/or business process standards, requirements and policies compliance criteria vector database comprises generating a query based on the concepts and/or elements identified by the LLM that is consistent with terminology, acronyms and formats used in organizational structures and/or business process standards, requirements and policy documents.

Some aspects may further include accessing identified relevant standards, requirements, or policies documents, wherein prompting the LLM to determine (e.g., infer and output) whether the one or more organizational structures and/or business process documents comply with each of the identified relevant standards, requirements, or policies comprises submitting each identified relevant standard, requirement, or policy document to the LLM individually along with a prompt to determine (e.g., infer and output) whether the one or more organizational structures and/or business process documents comply with the submitted standard, requirement, or policy document. Some aspects may further include submitting each standard, requirement, or policy document to the LLM in a manner that accommodates a token limitation of the LLM.

Some aspects may further include using document links provided by the organizational structures and/or business process standards, requirements, and policies compliance criteria vector database with the identified relevant standards, requirements, or policies to obtain the relevant software standards, requirements and policy documents from a standards, requirements, and policy repository for use in prompting the LLM.

Further aspects include a computing system including one or more computing devices coupled to or including at least one large language model (LLM) and a memory, in which the computing system is configured to perform operations of any of the methods summarized above. Further aspects include a non-transitory processor-readable storage medium having stored thereon processor-executable software instructions configured to cause a computing system to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIG. 5 is a process flow diagram illustrating a method for automatically evaluating organizational structures and/or business process documentation for compliance with relevant standards, requirements, and policies according to some embodiments.

DETAILED DESCRIPTION

Figure 1:
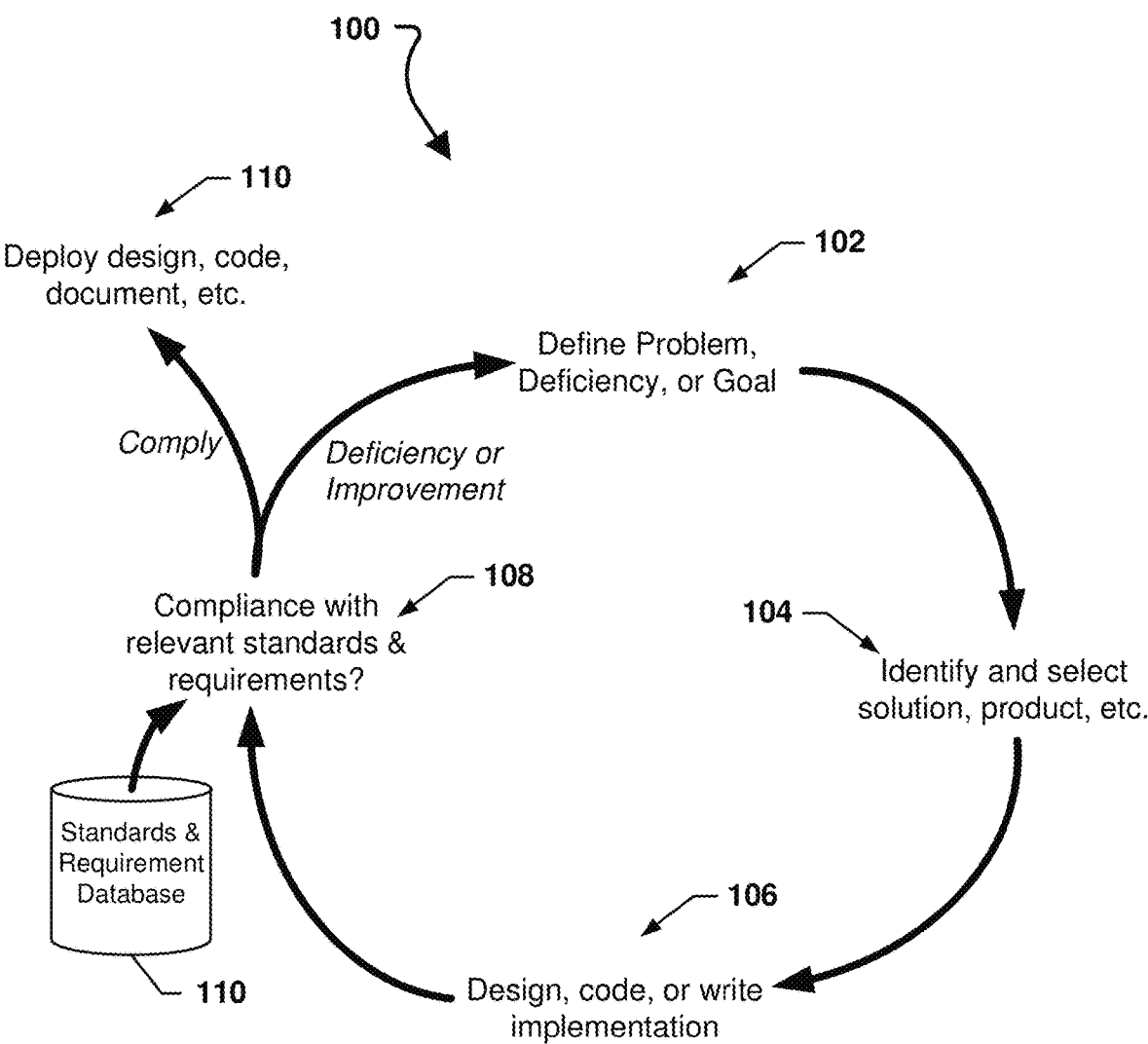
FIG. 1 is diagram of a typical organizational structure and business process development cycle.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and a computing system implementing such methods for automatically evaluating organizational structures and/or business process documentation for compliance with relevant standards, requirements, and policies, to ensure alignment with evolving directives and industry best practices. In particular, various embodiments provide a framework for the evaluation of organizational structures and/or business process documentation for compliance with relevant standards, requirements, and policies, allowing users to submit application-related documents in native form and receive reports regarding compliance and insightful suggestions and considerations related to improving designs and achieving compliance without requiring domain-specific training of the computing system. Examples of organizational structures and/or business process documentation that may be evaluated include defined business processes, business rules, organizational structures, business analyses, project management documents, expected business outcomes or projections, project scopes, adherence to responsibilities, communication protocols, and decision-making standards.

Various embodiments may include receiving organizational structures and/or business process documents for evaluation and a requested analysis or evaluation to be conducted on the documents, and transforming the request for analysis or evaluation and documents into a format suitable for processing by a large language model (LLM). The documents and analysis request may be used to prompt the LLM to process to identify (e.g., infer and output) concepts and/or elements of the documents that are likely to be a subject of a standard, requirement, or policy. Various embodiments may reformat the concepts and/or elements identified by the LLM into a search query with terms and structures suitable for presenting to an organizational structures and/or business process standards, requirements, and policies compliance criteria vector database to identify standards, requirements, or policies that are relevant to the organizational structures and/or business process documentation and the requested analysis or evaluation. Various embodiments use relevant standards, requirements, or policies identified by the compliance criteria vector database search to prompt the LLM (or another LLM) to determine (e.g., infer and output) whether the input organizational structures and/or business process documents comply with each of the identified relevant standards, requirements, or policies. The output of this LLM comparison analysis may be compiled to produce a report regarding compliance of the organizational structures and/or business process documentation with each of the identified relevant standards, requirements, or policies. In addition to reporting compliance and non-compliance, the LLM may include in the compiled report advice or suggestions on how the organizational structures and/or business process may be improved to better comply with one or more of the relevant standards, requirements, or policies.

The term "computing device" is used herein to refer to stationary computing devices including personal computers, desktop computers, all-in-one computers, workstations, super computers, general purpose GPUs, mainframe computers, embedded computers (such as in vehicles and other larger systems), computing systems within or configured for use in servers, cloud computing systems and enterprise computing systems.

The term "compliance criteria vector database" is used herein to refer to a database that stores documents, or addresses or links to documents, that identify or define standards, requirements, or policies that are relevant to organizational structures and/or business process documentation, storing such information in a vectorized data structure. A vector database stores data items (e.g., standards, requirements, or policy documents) in the form of vectors or arrays of numbers representing features of the data items. Storing data items (e.g., documents) in the mathematical form of vectors enables rapid identification of data items with similar features (e.g., requirements or specifications) by calculating a vector distance between vector representations of search queries and data item vectors. The compliance criteria vector database enables the computing system to rapidly identify organizational structures and/or business process standards, requirements, and/or policy documents that pertain or may pertain (i.e., are similar) to the organizational structures and/or business process documentation under review.

Various embodiments are described in terms of processor-executable instructions, for ease and clarity of explanation, but may be similarly applicable to any data, e.g., text, prompts, program data, or other information stored in memory. The terms "prompts", "text", "data", "sequence, "tokens", and "information" are used interchangeably herein and are not intended to limit the scope of the claims and descriptions to the types of instructions or information used as examples in describing various embodiments.

Various embodiments are described with reference to artificial intelligence (AI) models and modules. The term "AI model" is used herein to refer generally to any of a variety of computer models that have been trained on a dataset of images, text, or combinations of text and images to receive a prompt in various forms and output a response or inference consisting with the training dataset. The term "large language model" (LLM) is used herein to refer to an AI model that is trained on language to understand the meaning of words and generate text that is responsive to written prompts. Many AI models including LLMs make use of neural network architectures, which include a large number of layers of processing nodes that receive input values, perform computations based on the input values and weights, and propagate the result (referred to as "activations") to the next layer. AI models "learn" by adjusting weights and biases that affect the activations from node to node across layers. To produce an output in response to an input ("prompt"), an AI model performs hundreds of matrix multiplications like this formula across all of the layers to yield a final calculation, which can be transformed into words or images. Consequently, the information learned by an AI model is encoded in matrices of weights and biases, and not in code, databases, or tables algorithm-based processing methods. However, conventionally programmed computing devices (i.e., algorithm-based programming) can use AI models as part of their processing by prompting an AI model (e.g., via an application programming interface (API)).

Various embodiments include methods and a computing system providing an organizational structures and/or business process evaluation framework that is configured to enable users to submit organizational structures and/or business process documentation in native form, and receive reports on the compliance with and suggestions to better adhere to relevant organizational structures and/or business process standards, requirements, and policies without requiring domain-specific training. Various embodiments leverage the capabilities of large language model (LLM) generative AI capabilities to perform organizational structures and/or business process documentation compliance reviews against relevant standards, requirements and policy documents that would otherwise require teams of human experts to complete.

In various embodiments the computing system may include an interface, such as an application programming interface (API), that receives from a user's computer or workstation uploaded organizational structures and/or business process documentation, as well as requested analysis or evaluation details. This interface may reformat the inputted documents and requests into formats suitable for organizational structures and/or business process compliance processing by the computing system, enabling the computing system to accommodate organizational structures and/or business process documentation of multiple programming languages and design frameworks without requiring the computing system to use specific LLM AI models or be limited to specific computing language data formats and data management frameworks.

When evaluating organizational structures and/or business process documentation compliance with new standards, a computing system according to various embodiments analyzes the documentation and requested analysis/evaluation input by a user via a user interface, uses an LLM to identify concepts and/or elements within the inputs likely to be subject to one or more standards, requirements and/or policies, uses the identified concepts and/or elements to query a compliance criteria vector database that reflects a repository of standard, requirement, and policy documents to identify one or more standards, requirements and/or policies that apply or are relevant to the input, retrieves the identified relevant standard, requirement, and/or policy documents from the repository, uses an LLM to evaluate compliance of the inputted organizational structures and/or business process documentation with each retrieved standard, requirement, and/or policy, and generates an evaluation response or report that may indicate aspects of compliance and non-compliance, as well as provide suggestions for revising organizational structures and/or business process designs to achieve compliance with standards, requirements and/or policies.

The use of one or more LLMs to evaluate documentation to identify concepts and/or elements for identifying and evaluating compliance with relevant standards, requirements, and policies documents ensures consistency of the evaluations by enabling the comprehension and analysis of the broad spectrum of semantic information within business documentation, including understanding relevant business processes, rules, organizational structures, responsibilities, communication protocols, and decision-making processes and practices. This allows the computing system to support business leaders aligning initiatives with the organization's specific requirements and directives. For example, if an organization introduces new business requirements, the computing system of various embodiments can review the new information and compare it against existing business process, rule, standard, and policy documents maintained in the repository to ensure compliance.

Various embodiments make use of one or more LLMs to perform semantic analyses and provide compliance evaluations of organizational structures and/or business process designs against an actively curated repository of standards, requirements, and policies. By employing an LLM to evaluate submitted organizational structures and/or business process documentation and requested evaluations, the computing system may identify elements that typically have associated standards, requirements and/or policies with which compliance should or must be demonstrated before the such products can be deployed. The language understanding capabilities of an LLM enable the computing system to comprehend the contextual nuances and intricate relationships within business documentation. Providing this understanding of business documents allows for more accurate evaluations of organizational structures, processes, and their alignment with prevailing standards, requirements, and policies. Identified elements of the organizational structures and/or business process documentation and requested evaluations are applied to the compliance criteria vector database to identify those standards, requirements and/or policies within the repository that are relevant to a requested compliance evaluation. This ensures relevant standards, requirements and policies are considered while avoiding consideration of irrelevant documents.

The computing system of various embodiments may leverage Retrieval Augmented Generation (RAG) techniques to automatically accommodate updates to the standards, requirements, and policies by searching the same repository as business leaders, business teams, and compliance human review teams use, ensuring alignment with the most current standards, requirements, and policies without requiring modifications to the computing system. In some embodiments, modifications or new additions to the standard, requirement, and policy documents repository may trigger an automatic update in the computing system's compliance criteria vector database that is used to identify standards, requirements, and policies relevant to a given compliance evaluation. This approach ensures consistent alignment of compliance evaluations of organizational structures and/or business process documents with the same standards, requirements and/or policies that development teams use.

The computing system may use one or more autoregressive LLMs (e.g., GPT-3.5, GPT-4, LLAMA, Mistral, Claude, Bard, etc.) for language processing and analysis, ensuring familiarity with many common organizational structures and/or business process frameworks. Various embodiments can adapt to support evaluations of organizational structures and/or business process of a specific database management software or framework by updating, further training, or replacing the LLM that performs the compliance evaluation of the organizational structures and/or business process documentation.

The flexibility of various embodiments enabled through the use of LLMs and compliance criteria vector databases generated from a repository of standards, requirements, and policies means the computing system can support compliance and similar reviews by many different types of businesses, including startups featuring dynamic structures and established corporations of various organizational structures and processes. The dynamic natural language analysis capabilities of various embodiments enable the computing system to evolve and adapt to the mutable nature of evolving business best practices and organizational requirements and directives for all types of businesses.

Use of the computing system may be integrated into development security operations (DevSecOps) that integrate security practices within organizational structures and business processes. For example, the computing system may be used as part of a security standards compliance reviews of organizational structures and business processes, ensuring business practices meet security standards and requirements. This may ensure that security issues are identified and addressed in organizational structures and business processes, reducing the risk of security breaches and costly recovery or rework later on.

FIG. 1 is a notional diagram of high-level activities involved in a typical design cycle for organizational structures and business processes that may be performed by organizations in the process of developing and deploying solutions to problems, developing new products for customers, and providing recommended solutions to client problems. The activities illustrated in FIG. 1 are described generally and actual processes implemented by companies and organizations may differ. Regardless, a key stage in many development and innovation cycles involves the critical evaluation of the documentation for product designs, code, software applications, business plans, etc. against a variety of standards.

In any product development or problem solution process 100, a first step 102 may be to define the problem or deficiency that requires a solution or otherwise clearly articulate the goal of the development or problem solution process. With the problem, design deficiency or goal clearly in mind, in step 104 those charged with identifying a solution to a deficiency or otherwise developing a product or service that achieves the defined goal (i.e., the problem solvers) may identify potential solutions or products, evaluate their ideas, and select a best solution, product, design, system architecture, etc. to pursue.

In step 106, a design or development team (i.e., the solution developers) may turn the selected product, service or business idea into product designs, code, software, system architecture, business plans, etc. that can be evaluated before implementation. As part of this step 106, the design or development team will generate documentation for the product designs, code, software, system architecture, business plans, etc., defining the design elements, describing operations and outcomes, and otherwise putting into writing a complete description of their work that can be evaluated and used in the production and servicing of the final product, service, architecture, or business plan.

In step 108, the documentation for the product designs, code, software, system architecture, business plans, etc. created by the solution developers in step 106 may be critically evaluated against relevant technical, government, business, and financial standards, and requirements before a deployment or further refinement decision can be made. This evaluation may also evaluate the organizational structures and/or business process documentation against various relevant business, organization, and governmental policies. In many circumstances such evaluations may be conducted by a new team of individuals who are familiar with or experts in the relevant standards, requirements, and policies, as well as knowledgeable about the underlying technologies. In many circumstances the evaluation of the designs, code, software, system architecture, business plans, etc. documentation requires critical comparisons to a large number of relevant standards and requirements, such as design criteria, government regulations, environmental rent regulations, organizational policies, management decision-making criteria, and similar documents, which may be stored in a database or repository 110. In order to ensure that such compliance reviews are conducted based on the most relevant standards, requirements, and policies, a library of current standards, requirements, and policy documents, the repository 110 may be updated regularly and independently of the problem solving, design, code, solution review cycle. In addition to providing the authoritative source for various standards, requirements and policies, the repository 110 may also serve as the organization's internal knowledge base, business records, management directives, and organizational policy documents that may be relevant to organizational structures and/or business process evaluations.

Typical compliance reviews of designs, organizational structures and business process, system architectures, business plans, etc. may involve several steps. For example, a compliance review team may: identify elements in design, software, system architecture, business plan, etc. documentation that may be the subject of or associated with particular standards, requirements and/or policies; request or conduct a search of the current standards, requirements, and organizational policy documents repository 110 to identify the relevant documents to use in the evaluation; rigorously evaluate the design, software, system architecture, business plans, etc. documentation against the relevant documents identified in the search; determine whether the design, software, system architectures, business plans, etc. comply with relevant standards, requirements and policies; and generate recommendations to accept, implement or deploy compliant designs, organizational structures and/or business process, business plans, etc. in step 110, or identify deficiencies and make recommendations for further work to address deficiencies in a repeat of the development process in step 102. In many circumstances, such compliance reviews 108 can be expensive and time consuming due to the number and variety of relevant standards, requirements, and organizational policy documents that must be addressed, as well as the number of human reviewers with the various technical, business and/or regulatory expertise required to conduct the evaluations.

Figure 2:
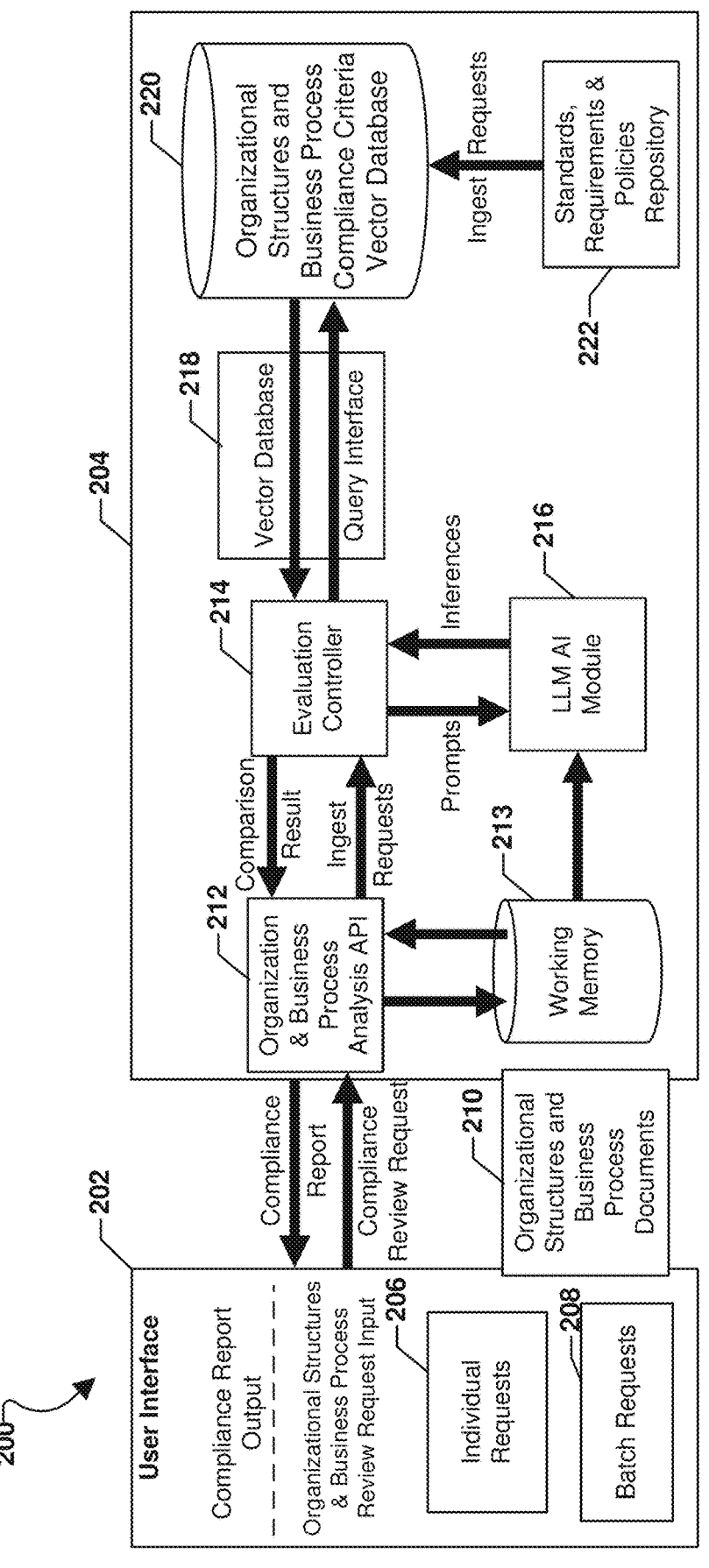
FIG. 2 is a component block diagram illustrating an example computing system suitable for implementing various embodiments.

To facilitate and streamline the conduct of compliance reviews of design, software, system architectures, business plans, etc., various embodiments include a compliance evaluation framework 200 illustrated in FIG. 2 that leverages AI technologies, particularly large language models (LLM), and efficient search technologies to at least partially automate compliance reviews. As described above, the compliance evaluation framework 200 methods and computing system enable the automatic evaluation of organizational structures and/or business process documentation against relevant standards, requirements and policies by: identifying in user-submitted organizational structures and/or business process documentation concepts and/or elements that typically have associated standards, requirements or polices; searching a standards, requirements, and policy repository for these elements or standards using a compliance criteria vector database to identify relevant standard, requirement and/or policy documents; comparing the organizational structures and/or business process documentation against identified relevant standard, requirement and/or policy documents (e.g., obtained from the repository) to determine areas/aspects of compliance and non-compliance; and generating a response or report identifying a degree of compliance and non-compliance with suggestions for how non-compliant aspects of organizational structures and/or business process may be improved.

With reference to FIGS. 1-2, the compliance evaluation framework 200 may include a user interface system 202 configured to receive user analysis requests and documents for evaluation and output compliance reports, and a computing system 204 configured to perform the compliance evaluations against relevant standards, requirements and/or policies.

The user interface 202 may be deployed on a user computer or workstation and be configured in software to perform the interface functionality described herein. In particular, the user interface 202 may be configured to receive or obtain (e.g., via a network) organizational structures and/or business process documentation that is to be evaluated. For example, the user interface 202 may be configured to enable a user to select particular organizational structures and/or business process documents from a network library 210 of such documents, and download selected documents for evaluation.

The user interface 202 may also be configured to receive user inputs specifying the type of analysis or evaluation to be completed on the inputted or obtained organizational structures and/or business process documentation. In some embodiments, the user may type in the type or description of the analysis or evaluation to be conducted. In some embodiments, the user interface 202 may be configured to present a menu or list of predefined analyses and/or evaluations from which the user may select (e.g., via a mouse click on an associated icon).

The user interface 202 may be configured to receive and relay individual requests 206 for analysis or evaluation, such as compliance reviews of one or more input organizational structures and/or business process documents. In some embodiments, the user interface 202 may be configured to receive multiple requests for analysis or evaluation of multiple sets of organizational structures and/or business process documents, and present the analyses or evaluations in batch requests 208, such as by sequentially submitting documents and requests to the computing system 204 as each preceding analysis/evaluation is completed.

The user interface 202 may be configured to provide the received or downloaded documents along with the user-specified analysis/evaluation to the computing system 204, such as via an organizational structures and/or business process analysis application programming interface (API) 212. Such an organizational structures and/or business process API 212 may be configured to function as an interchange between the user interface 202 and the computing system 204 for receiving analysis/evaluation requests and outputting results of the analysis/evaluation. To accomplish this functionality, the organizational structures and/or business process API 212 may be configured to temporarily store received organizational structures and/or business process documents and analysis/evaluation requests in working memory 213 before or in parallel with providing the documents and analysis/evaluation request to an evaluation controller 214.

In some embodiments, the user interface 202 may also (or alternatively) be configured as a machine interface to accommodate automated communications with another computing system. In such embodiments, a machine interface may be configured to receive inputs and directions from another computer that is programmed or trained to upload documents for review and identify the type of review or reviews to be performed. For example, the user interface 202 may be configured to receive uploads and instructions from an AI agent or LLM, which may be directed by a human user (e.g., via prompts and agent task descriptions). Also, such a machine interface may be configured to specify or provide report formats that support structured schemas, enhancing interoperability with automated systems. Embodiments including a machine interface may allow the same system to handle automated processes, like Continuous Integration/ Continuous Deployment (CI/CD), which may allow the system to prevent the implementation of organizational structures and business processes until compliance deviations are addressed. References to "user interface" herein and in the claims are intended to encompass both human user interface and machine interface configurations.

The evaluation controller 214 may be a separate processor or software module within the computing system 204 that is configured to interface with an LLM AI module 216 for performing various analyses. In particular, the evaluation controller 214 may serve an orchestrating function coordinating operations with the LLM 216 to identify and obtain the relevant standards and requirements and use the LLM to perform the comparison and compliance analysis functions before assembling and providing the analysis/evaluation results to the organizational structures and/or business process API 212 for relay to the user interface 202.

As an early operation in the analysis/evaluation of input documents, the evaluation controller 214 may be configured to prompt the LLM 216 to identify one or more concepts and/or elements in the organizational structures and/or business process documentation and requested analysis/evaluation that are likely to be covered by standards, requirements and/or policies. This operation may involve providing the received organizational structures and/or business process documentation, specifying the requested type of analysis/ evaluation to be performed by the LLM. The evaluation controller 214 may then prompt the LLM to analyze the documentation in light of the requested analysis/evaluation to identify concepts and/or elements of the documentation involved in the analysis/evaluation that can be used to identify the relevant standards, requirements and/or policies. In response, the LLM 216 may return inferences in the form of a plain language response that identify concepts and/or elements of the organizational structures and/or business process documentation responsive to the prompt through its ability to understand and summarize written language.

Upon receiving the plain language response from the LLM 216, the evaluation controller 214 may provide the identified concepts and/or elements to a compliance criteria vector database query interface module 218. This module 218 may be configured through programming to reformat, transform, and/or translate natural language concepts and/or elements identified by the LLM into queries suitable for processing by the standards and requirements compliance criteria vector database 220. The standard, requirements, and policies relevant to a particular technological or language domain of development, such as organizational structures and/or business process design, may feature specific formats, jargon, acronyms, and terminology that may not be known to the LLM 216. Rather than requiring the use of a specialized LLM trained specifically for the organizational structures and/or business process domain, various embodiments may include a compliance criteria vector database query interface module 218 that is configured or trained to translate the concepts and/or elements into terminology and format compatible with the compliance criteria vector database. This module may be a software module or API that is specially coded or trained to reformat, transform and/or translate natural language concepts and/or elements produced by the LLM into queries with a form and content suitable for conducting searches using the organizational structures and/or business process standards, requirements, and policies compliance criteria vector database 220. Using a compliance criteria vector database query interface module 218 to translate the concepts and/or elements output of the LLM into queries suitable for processing by the organizational structures and/or business process standards, requirements, and policies compliance criteria vector database 220 enables the use of a general language LLM to work with standards and requirements that are unique to the domain of the compliance evaluation.

A compliance criteria vector database 220 is used to support searches for organizational structures and/or business process standards, requirements and policies that are relevant to the requested analysis/evaluation and uploaded organizational structures and/or business process documentation. The organizational structures and/or business process standards and requirements compliance criteria vector database 220 may be a vectorized version of the standards, requirements and policy documents maintained in a standards, requirements, and policy repository 222. A compliance criteria vector database encodes the features of standards, requirements and policy documents in a manner that facilitates queries that enable a compact yet flexible determination of relationships between the documentation being evaluated and the standard, requirement, and policy documents in the repository 222 to identify those documents that are most relevant to the compliance evaluation.

A vector database represents the content of documents as vectors, in which each dimension of the vector corresponds to a specific word or phrase. In the context of standards, requirements, and policy documents, which may be very long, the compliance criteria vector database may be populated with vectorized portions or individual standards/requirements, thereby limiting the number of dimensions to the words of specific elements or subsections to facilitate searches on an aspect-by-aspect or requirement-by-requirement basis. Such a compliance criteria vector database enables efficient searching for standards, requirements, and policies that are most relevant to the organizational structures and/or business process documentation being evaluated based on their concepts and/or elements.

By measuring the similarity between the vectors representing different concepts and/or elements in the organizational structures and/or business process documentation and individual standard, requirement, and policy vectors, the compliance criteria vector database may identify correlations between them and provide measures of relevance, such as in the form of a vector distance or difference that can be used to identify those standards, requirements, and policy documents that are within a threshold degree of relevance. This approach, which is commonly used in information retrieval and natural language processing applications enables the identification of relevant documents while avoiding consideration of irrelevant or only tangentially related standards, requirements, and policies.

As described herein, the compliance criteria vector database 210 is generated from a repository 222 of standards, requirements and policies that is regularly updated. This repository 222 is then accessed to obtain the identified relevant standards, requirements, and policy documents for evaluation against the uploaded organizational structures and/or business process documentation. As described, the computing system's capability to utilize the same current and authoritative documents as human compliance teams would use eliminates the risk of relying on outdated or duplicated standards, ensuring that computerized compliance evaluations provided by various embodiments are conducted using the latest approved standards, requirements, and policies.

In some embodiments, the compliance criteria vector database 220 may be regularly updated by accessing and vectorizing the organizational structures and/or business process standards, requirements, and policy repository 222. The repository 222 may be updated whenever there is a change to a standard, requirement, or policy or a new such document added. In some embodiments, the organizational structures and/or business process standards, requirements, and policies repository 222 may notify the compliance criteria vector database 220 when an update is made to enable timely vectorizing of changed and/or new standards, requirements, or policies to keep the compliance criteria vector database 220 up to date. In some embodiments, the compliance criteria vector database 220 may perform an update at the time an analysis or evaluation is initiated by accessing the standards, requirements, and policy repository 222 and performing an ingest and vectorization operation.

In response to a search query received from the compliance criteria vector database query interface module 218, the compliance criteria vector database 220 may identify those standards, requirements and/or policies that are relevant to the query, which, again, is based on the concepts and/or elements of the organizational structures and/or business process documentation. As noted above, the compliance criteria vector database 220 may identify those individual standards, requirements and/or policies that are within a threshold degree of relevance (e.g., within a vector distance threshold) to the analysis/evaluation and the submitted organizational structures and/or business process documentation.

The compliance criteria vector database 220 may respond to the submitted query by outputting a list of the standards, requirements and policy documents containing the identified relevant aspects to the organizational structures and/or business process concepts and/or elements. This list of documents may also include links or addresses of where the computing system 204 can obtain the identified documents from the standard, requirement, and policy documents repository 222 and/or other sources (e.g., the Internet).

The compliance criteria vector database query interface module 218 may be further configured through software programming to provide the list and links of identified standards, requirements, and policy documents to the evaluation controller 214.

The evaluation controller 214 may be further configured to use the list and links of identified standards, requirements, and policy documents in a series of prompts to the LLM 216 that are configured to cause the LLM to perform the requested analysis or evaluation of the organizational structures and/or business process documentation. More specifically, the evaluation controller 214 may be configured through software programming to upload (or provide links to) individual standards, requirements, and policy documents in a format and sequence that the LLM 216 can accept and process. The evaluation controller 214 may be configured to generate prompts that will cause the LLM to make comparisons and arrive at conclusions for the requested analysis or evaluation, as well as generate text based on the comparisons and conclusions for use in assembling a compliance report.

The evaluation controller 214 may be configured to present documents and prompts to the LLM 216 in a sequence and manner that is compatible with the capabilities of the LLM. For example, LLM's have a limit on the number of tokens (roughly equivalent to words) that can be processed and used in responding to a prompt, so the evaluation controller 214 may be configured to break up the analyses of the standards, requirements, and policy documents into blocks, segments, subsections, or tranches that the LLM is capable of handling at a time.

Also, the evaluation controller 214 may be configured to present prompts in a logical sequence that enables the LLM to draw proper conclusions, such as presenting to the LLM 216 interrelated standards or requirements in a sequence that enables the LLM to arrive at a consistent conclusion. For example, if a set of standards or requirements build on multiple elements or require harmonized compliance, the evaluation controller 214 may be configured to present prompts for comparisons of organizational structures and/or business process documentation to component standards or requirements before prompting for comparisons of the documentation to standards or requirements that depend on the components.

To support the documentation compliance comparisons, the relevant standards, requirements, and policy documents may be obtained from the standard, requirement, and policy documents repository 222 using links or addresses supplied in the list of relevant documents provide by the compliance criteria vector database 220. In some embodiments, the evaluation controller 214 may use the link or address to obtain a single standard, requirement, or policy document at a time and relay that document to the LLM 216 in conjunction with one or more prompts. In some embodiments, the evaluation controller 214 may provide the LLM 216 with the link or address as part of one or more prompts to enable the LLM to obtain the standard, requirement, or policy document relevant to the prompts. In some embodiments, the evaluation controller 214 may use the links or addresses to obtain all standard, requirement and/or policy documents from the repository 222 and store the documents in working memory 213 for provision to the LLM 216 in conjunction with prompts. In some embodiments, documents may be obtained from the repository 222 and/or stored in working memory 213 using a combination of these alternative methods. In some embodiments, the evaluation controller 214 and/or the LLM 216 may obtain some documents from other sources, such as the Internet.

The evaluation controller 214 may be configured to receive the inferences or outputs of the LLM 216 and assemble the outputs into a format for reporting to the user. The evaluation controller 214 may temporarily store outputs from the LLM 216 in working memory 213 until all outputs have been received when the LLM has completed all analyses/evaluation of all aspects of the organizational structures and/or business process documentation against all identified relevant standards, requirements and/or policy documents. To generate a final compliance report, the evaluation controller 214 may make use of the LLM 216 to assemble, correlate, and rewrite the outputs into a format that the evaluation controller 214 may specify in a prompt. In this manner, the evaluation controller 214 may be configured to generate a final comparison or compliance report that can be provided to the organizational structures and/or business process API 212 for output to the user via the user interface 202.

While this description of the computing system 204 refers to the use of a single LLM 216, some embodiments may include and make use of multiple LLMs trained and configured to perform different aspects of the compliance analysis/evaluation process. For example, a first LLM (e.g., 216) may be trained to analyze the requested analysis or evaluation and the submitted organizational structures and/or business process documentation, and a second LLM (e.g., 420 in FIG. 4) may be trained to perform the comparisons of the analysis/evaluation of the submitted organizational structures and/or business process documentation against the relevant standard, requirement and policy documents, and generate the conclusions and recommendations. In some implementations, training separate LLMs to perform these different analyses may be more efficient and cost effective than training or expecting one LLM to perform both. Additionally, some of the functionality involved in the evaluation controller 214 and the compliance criteria vector database query interface module 218 may be accomplished using another generative AI model (e.g., a specialized LLM) that is trained to perform certain tasks, such as translation or formatting of technical terminology.

In a further embodiment, machine learning techniques may be implemented in some modules of the computing system 204 to learn from user interactions with the system and adapt some modules to improve the performance of compliance analyses and evaluations as the system is used and responsive to user feedback. For example, one or more LLMs may be augmented with machine learning capabilities to fine tune operations and inferences generated when performing compliance analyses and evaluations based on user feedback (e.g., requests for a repeat of an analysis or evaluation with changed instructions). As another example, the evaluation controller 214 may be configured with machine learning capabilities to learn over time how to improve the generation of prompts for the LLM and introduce documents based on the nature of LLM responses and user feedback.

In a further embodiment, the user interface 202 and/or the computing system 204 may be configured (e.g., including interface modules or APIs) to interface with business systems of the organization to facilitate storage of reports and/or implementation of improvement recommendations.

Figure 3:
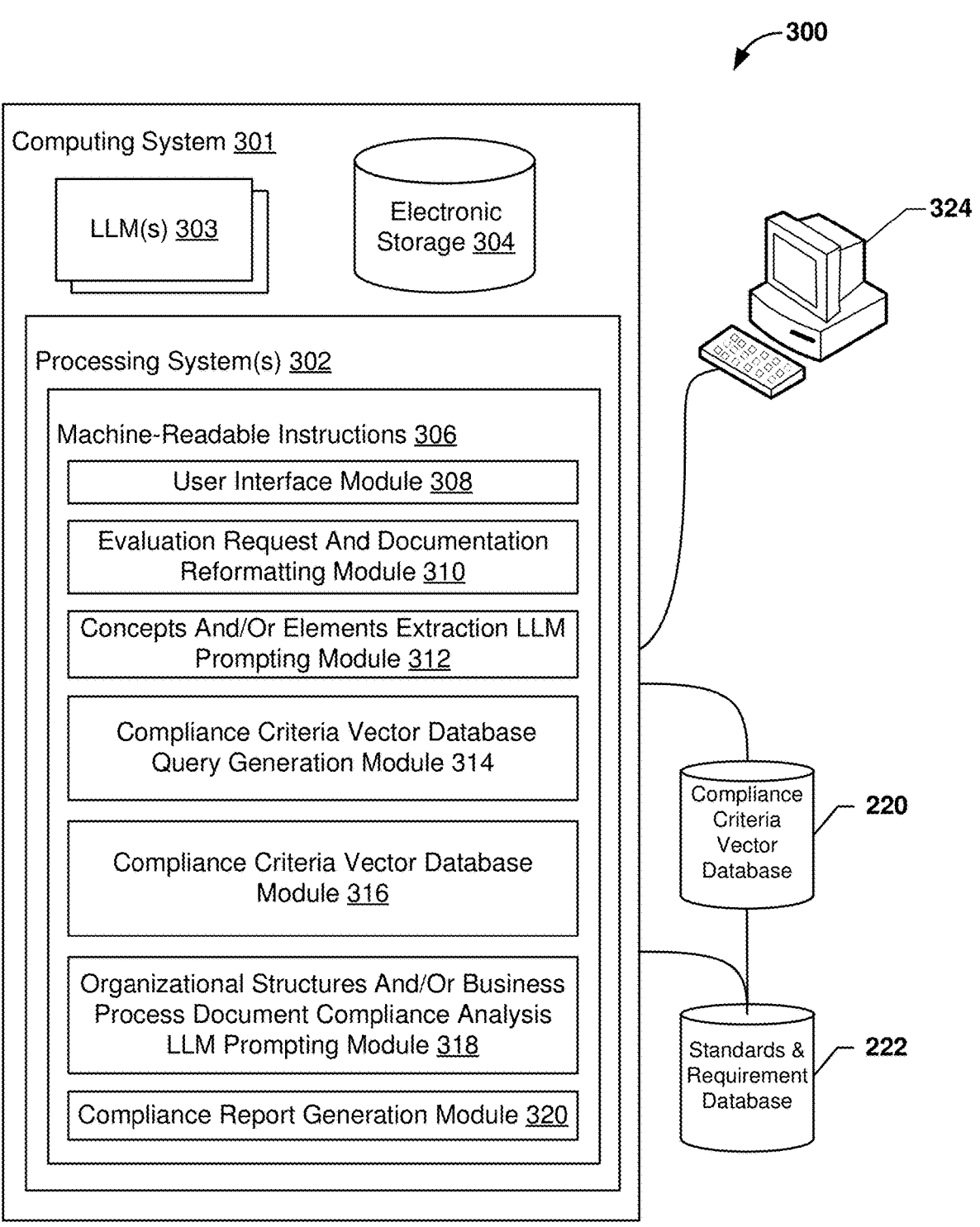
FIG. 3 is component and software module block diagram illustrating a computing device and software modules suitable for implementing various embodiments.

FIG. 3 are component block diagrams illustrating a system 300 configured for evaluating organizational structures and/or business process documentation against relevant standards, requirements, and policies in accordance with various embodiments. With reference to FIGS. 1-3, the system 300 may include a computing system 301. The computing system 301 may include one or more processing systems 302 coupled to one or more LLMs 303 and electronic storage 304. The computing device 302 may be coupled to a user interface computer 324 configured to receive documentation for evaluation, user input requests for analyses and evaluations, and display and/or print report outputs. The computing system 301 may also be coupled to a standards, requirements, and policy compliance criteria vector database 220 and a standard, requirement, and policy documents repository 222 as described with reference to FIG. 2.

The processing system(s) 302 may be configured by machine-readable instructions 306. Machine-readable instructions 306 may include one or more instruction modules. The instruction modules may include computer program modules. In some embodiments, the functions of the instruction modules may be implemented in software, firmware, hardware (e.g., circuitry), or a combination of software and hardware, which are configured to perform particular operations or functions. The instruction modules may include one or more of a user interface module 308, an evaluation request and documentation reformatting module 310, a concepts and/or elements extraction LLM prompting module 312, an organizational structures and/or business process standards compliance criteria vector database query generation module 314, an organizational structures and/or business process standards, requirements, and policies compliance criteria vector database 316, an organizational structures and/or business process compliance analysis LLM prompting module 318, a compliance report generation module 320, and/or other instruction modules.

The one or more LLMs 303 may be hosted locally within the computing system 301 or deployed in a remote server system that the processing system(s) 302 may access via a local network or the internet. In some embodiments, the computing system 301 may include or access one generally trained LLM 303. In some embodiments, the computing system 301 may include or access multiple LLMs 303 that are individually trained or fine-tuned to perform different types of language-related processing in response to prompts as described herein.

The user interface module 308 may be configured to perform operations including receiving from a user interface one or more organizational structures and/or business process documents for evaluation and requested analysis or evaluation to be conducted on the one or more organizational structures and/or business process documents. The user interface module 308 may be configured to accept organizational structures and/or business process documentation in the native format used by business teams, and perform some reformatting as may be needed to support the requested analysis/evaluation by the rest of the computing system 204.

The evaluation request and documentation reformatting module 310 may be configured to perform operations including transforming the received request for analysis or evaluation and the one or more organizational structures and/or business process documents into a format suitable for processing by the LLM 303. For example, the evaluation request and documentation reformatting module 310 may be configured to reformat or translate code or software of one language or protocol into a language, format, and/or protocol compatible with the LLM 303 and other elements of the computing system 204. In some embodiments, the evaluation request and documentation reformatting module 310 may also be configured to translate organizational structures and/or business process terminology and acronyms into natural language understandable by the LLM 303.

The concepts and/or elements extraction LLM prompting module 312 may be configured to perform operations including prompting the LLM 303 to process the one or more organizational structures and/or business process documents and the requested analysis or evaluation to identify (e.g., infer and output) concepts and/or elements that are likely to be a subject of a standard, requirement, or policy. For example, the concepts and/or elements extraction LLM prompting module 312 may be configured to generate a prompt for the LLM 303 that attaches one or more of the submitted organizational structures and/or business process documents along with the requested analysis or evaluation and instructs the LLM to evaluate the documents to identify particular aspects or features that are of a format or context that is typically addressed by standards, requirements and/or policies. In some embodiments, the concepts, and elements extraction LLM prompting module 312 may be configured to prompt a first LLM that may be fine-tuned or trained on a broad range of standard, requirement, and policy documents to provide the LLM with the capability to generate such inferences.

In some embodiments, the evaluation request and documentation reformatting module 310, a concepts and/or elements extraction LLM prompting module 312 may be implemented in one module, such as an evaluation controller 214.

The organizational structures and/or business process standards compliance criteria vector database query generation module 314 may be configured to perform operations including reformatting the concepts and/or elements identified by the first LLM into a query suitable for presentation to an organizational structures and/or business process standards, requirements, and policies compliance criteria vector database. For example, the organizational structures and/or business process standards compliance criteria vector database query generation module 314 may be configured to translate the concepts and/or elements identified by the LLM 303 into formats, taxonomies, and vocabularies that are compatible with the standards and requirements of the organizational structures and/or business process domain of the compliance review and the compliance criteria vector database 220. In some embodiments, the organizational structures and/or business process standards compliance criteria vector database query generation module 314 may also be configured to rephrase the context and elements output of the LLM into terminology and structures consistent with the types of standards, requirements, and policies of the technological or language domain of organizational structures and/or business process documentation.

The organizational structures and/or business process standards, requirements, and policies compliance criteria vector database 316 may be configured to perform operations including submitting the query to the organizational structures and/or business process standards, requirements, and policies compliance criteria vector database to identify standards, requirements, and/or policies that are relevant to the requested analysis or evaluation. In some embodiments, the organizational structures and/or business process standards, requirements, and policies compliance criteria vector database 316, or another module, may be configured to enable the computing system to obtain the identified relevant standard, requirement, and policy documents from the repository 222 in which current versions of the documents are maintained. This ensures compliance analyses/evaluations use the same authoritative documentation as the organizational structures and/or business process developers, enabling organizations to tailor evaluations and compliance reviews according to the standards, requirements, and policies relevant to organizational structures and business process.

As described, the organizational structures and/or business process standards, requirements, and policies compliance criteria vector database 316 may be generated from the standard, requirement, and policy documents repository 222, which may be the definitive source for all approved application standards. As described, the repository may be the same library or database of standard, requirements and policies that are consistently used and referred to by developers, business teams, and compliance review teams, ensuring that the computing system remains aligned with the latest standards. In some embodiments, modifications or new additions to the standards, requirements, or policies in the repository may trigger an automatic update in the organizational structures and/or business process standards, requirements, and policies compliance criteria vector database 316.

The organizational structures and/or business process document compliance analysis LLM prompting module 318 may be configured to perform operations including prompting the LLM 303 to determine (e.g., infer and output) whether the one or more organizational structures and/or business process documents comply with each of the identified relevant standards, requirements, or policies. For example, the organizational structures and/or business process compliance analysis LLM prompting module 318 may be configured to generate a prompt for the LLM that attaches one or more of the submitted organizational structures and/or business process documents along with an identified relevant standard, requirement or policy document, or one or few standards, requirements, or policies extracted documents, and requests a comparison consistent with the requested analysis or evaluation to identify and describe in words aspects of compliance and non-compliance. Such a prompt may also request an output of suggestions for improving the organizational structures and/or business process to correct any non-compliance.

In some embodiments, the organizational structures and/or business process document compliance analysis LLM prompting module 318 may be configured to prompt a second LLM, different from a first LLM, that is trained or fine-tuned to compare organizational structures and/or business process documentation to organizational structures and/or business process standards, requirements, and policies to identify compliance and non-compliance. In some embodiments, the organizational structures and/or business process document compliance analysis LLM prompting module 318 may also be configured to prompt the LLM 303 to output text identifying aspects of the one or more organizational structures and/or business process documents that comply with the identified relevant standards, requirements, or policies, and output text identifying non-compliant aspects of the one or more organizational structures and/or business process documents along with recommended changes to comply with the identified relevant standards, requirements, or policies. In some embodiments, the organizational structures and/or business process document compliance analysis LLM prompting module 318 may be configured to submit each identified relevant standard, requirement, or policy document, or one or a few standards, requirements or policies drawn from those documents, to the LLM 303 individually along with a prompt to determine (e.g., infer and output) text identifying non-compliant aspects of each document, standard, requirement or policy along with recommended changes to comply with the identified relevant standards, requirements, or policies.

In some embodiments, the organizational structures and/or business process document compliance analysis LLM prompting module 318 may also be configured to submit each standard, requirement, or policy document to the LLM 303 in a manner that accommodates a token limitation of the LLM. In some embodiments, the organizational structures and/or business process document compliance analysis LLM prompting module 318 may also be configured to use document links provided by the organizational structures and/or business process standards, requirements, and policies compliance criteria vector database with the identified relevant standards, requirements, or policies to obtain the relevant software standards, requirements and policy documents from a standards, requirements, and policy repository for use in prompting the LLM 303.

The compliance report generation module 320 may be configured to perform operations including producing a report comprising outputs of the LLM regarding compliance of the one or more organizational structures and/or business process documents with each of the identified relevant standards, requirements, or policies. For example, the compliance report generation module 320 may be configured to receive and assemble all of the compliance, non-compliance, and suggestion inference outputs of the LLM 303 into a report and/or display format that is appropriate for the requested analysis or evaluation. In some instances, a compliance report may need to comply with a specified firm, client, or agency format, in which case the compliance report generation module 320 may be configured to present the outputs of the LLM 303 in the specified report format.

The electronic storage 304 may include non-transitory storage media that electronically stores information. The electronic storage media of electronic storage 304 may include one or both of system storage that is provided integrally (i.e., substantially non-removable) with the computing device 301 and/or removable storage that is removably connectable to the computing device 301 via, for example, a port (e.g., a universal serial bus (USB) port, a firewire port, etc.) or a drive (e.g., a disk drive, etc.). Electronic storage 304 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 304 may include one or more virtual storage resources (e.g., cloud storage, a virtual private network, and/or other virtual storage resources). Electronic storage 304 may store software algorithms, information determined by processing system(s) 302, information received from the computing device 301, or other information that enables the computing device 301 to function as described herein.

The processing system(s) 302 may be configured to provide information processing capabilities in the computing device 301. As such, the processing system(s) 302 may include one or more of a digital processor, an analog processor, a digital circuit designed to process information, an analog circuit designed to process information, a state machine, and/or other mechanisms for electronically processing information. Although the processing system(s) 302 are illustrated as single entities, this is for illustrative purposes only. In some embodiments, the processing system(s) 302 may include a plurality of processing units and/or processor cores. The processing units may be physically located within the same device, or processing system(s) 302 may represent processing functionality of a plurality of devices operating in coordination. The processing system(s) 302 may be configured to execute modules 308-320 and/or other modules by software; hardware; firmware; some combination of software, hardware, and/or firmware; and/or other mechanisms for configuring processing capabilities on the processing system(s) 302. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 308-320 is for illustrative purposes, and is not intended to be limiting, as any of the modules 308-320 may provide more or less functionality than is described. For example, one or more of the modules 308-320 may be eliminated, and some or all of its functionality may be provided by other modules 308-320. As another example, the processing system(s) 302 may be configured to execute one or more additional modules that may perform some or all of the functionality of the modules 308-320.

Figure 4:
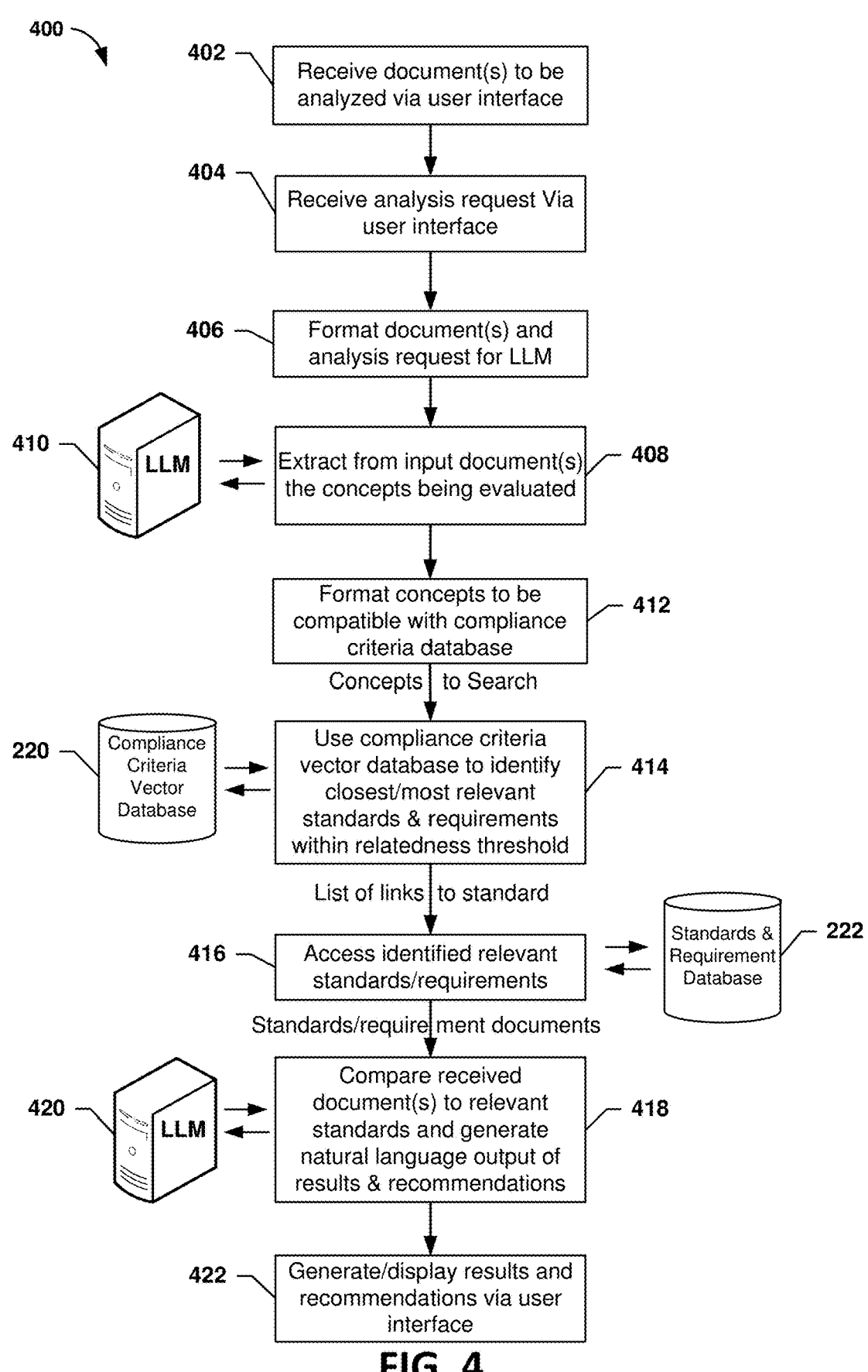
FIG. 4 is a processing flow drawing illustrating operations and modules for completing analyses and/or evaluations of organizational structures and/or business process documentation according to some embodiments.

FIG. 4 illustrates operations and components of a computing system 400 configured for automatically evaluating organizational structures and/or business process documentation for compliance with relevant standards, requirements, and policies in accordance with various embodiments. With reference to FIGS. 1-4, the computing system 400 may include the modules and components described with reference to FIGS. 2 and 3.

In block 402, the computing system 400 may receive documents for evaluation against relevant standards and/or requirements. For example, a user of the system may load into a user's computer or workstation 324 one or more documents including organizational structures and/or business process definitions, design documentation, and the like, and the user's computer or workstation may provide the documents to the computing system via a network (e.g., a local area network, the internet) or a direct connection. As described with reference to FIG. 2, the documents may be received by an organizational structures and/or business process API 212 and temporarily stored in working memory 213.

In block 404 the computing system 400 may receive user inputs identifying the type of analysis or evaluation that is requested to be performed on the organizational structures and/or business process documentation entered in block 402. This may be accomplished by a user of the system specifying the desired analysis/evaluation by typing instructions or selecting from among menu options provided by a user interface 202 executing in the user's computer or workstation 324. As noted above, the submission of documents in block 402 and the description of the analysis or evaluation to be conducted may be entered individually or submitted in a batch of analysis/evaluation requests.

In block 406, the organizational structures and/or business process API 212 and/or an evaluation controller 214 may format the documents and analysis/evaluation request for presentation to an LLM 410 (e.g., LLM 216, 303), which in some embodiments may be a first LLM. To enable the use of a general purpose LLM in the analysis and evaluation of a variety of organizational structures and/or business process documentation, the organizational structures and/or business process API 212 and/or an evaluation controller 214 may be configured to format the analysis/evaluation request as prompts for the LLM 410 and attach or submit the entered organizational structures and/or business process documents in sizes and formats that can be processed by the LLM. In some embodiments, the processing in block 406 may include translating terminology that is unique to the organizational structures and/or business process documentation into terms that the LLM may comprehend, such as replacing or defining jargon acronyms.

In block 408 the computing system 400 may use an LLM 410 (e.g., a first LLM) to extract the concepts reflected in the entered organizational structures and/or business process documentation and the requested analysis and/or evaluation for use in identifying the relevant standards and requirements. For example the LLM 410 may be prompted to analyze the entered organizational structures and/or business process documentation and the requested analysis and/or evaluation to determine subject matter or technical domain of the code or software, identify the nature of analysis and from this the types of standards and requirements that may be required, identify a regulatory or legal context for the requested analysis/evaluation, and/or identify other concepts and/or elements of the requested analysis and/or evaluation that may be useful for identifying relevant standards and requirements.

The use of an LLM 410 in block 408 enables the computing system 400 to be capable of accepting any form of organizational structures and/or business process documentation and performing a wide range of analysis and evaluations against relevant standards without the need for the system to be programmed for specific documents and specific evaluations. If necessary, an interface module (e.g., and user interface module 308 and/or an evaluation request and documentation reformatting module 310) may be used to perform some reformatting as may be needed to support processing, translating organizational structures and/or business process acronyms, symbols, or terminology into natural language that the LLM 410 is trained to understand.

The output of the LLM 410 in block 408 may be a natural language summary of the concepts and/or elements involved in the requested analysis and/or evaluation. This output may then be used to identify relevant standards, requirements and/or policy documents in subsequent operations.

In block 412 the computing system 400 may translate the concepts and/or elements identified by the LLM 410 into formats, taxonomies, and/or vocabularies that are compatible with the standards and requirements of the organizational structures and/or business process domain of the compliance review and the compliance criteria vector database 220. As described above, various embodiments may include a compliance criteria vector database query interface module 218 that performs the operations of block 412 to reformat, transform, and/or translate the concepts and/or elements output of the LLM 410 into queries suitable for processing by the standards and requirements compliance criteria vector database 220. As described, this processing in block 412 enables the use of a general language LLM 410 to analyze standards and requirements that are unique to the technological or language domain of the organizational structures and/or business process standards, requirements and policies that are the subject of the compliance evaluation. Thus, the operations in block 412 may include rephrasing the context and elements output of the LLM into terminology and structures consistent with the types of standards, requirements, and policies of the technological or language domain of organizational structures and business process.

In block 414, the computing system 400 may apply the output of block 412 to a compliance criteria vector database 220 to identify the standards, requirements and policies that are relevant to the requested analysis and/or evaluation and the organizational structures and/or business process documentation. As noted above, a compliance criteria vector database is a type of database that stores data in the form of vectors or arrays of numbers. In the context of documents and text, a compliance criteria vector database can be used to represent the content of documents as vectors, where each dimension of the vector corresponds to a specific word or phrase. This allows for efficient searching and comparison of documents based on their content. By measuring the similarity (or vector "distance") between the vectors representing the search context and the various documents represented in the database, it is possible to identify the documents that are most relevant to the context and elements specified in a search query. Thus, the operations in block 414 may use the capabilities of the compliance criteria vector database 220 to conduct a multidimensional analysis to identify those standards, requirements and/or policies that are within a threshold level of relevance or threshold "vector distance."

As described above, the output of the operations in block 414 may be a list of identified relevant standards and/or requirements with a link or address to each that can be used by the computing system and/or LLM to obtain each document from the standard, requirement, and policy documents repository 222.

In block 416, the computing system 400 may access or obtain the identified relevant standards and/or requirements from the standards and requirements database 222. In some embodiments, all of the identified relevant standards and/or requirements may be downloaded and cached in working memory (e.g., 213). In some embodiments, each identified standard, requirement and/or policy document may be accessed or downloaded from the organizational structures and/or business process standards, requirements, and policy repository 222 individually as needed by an LLM 420 to perform the analysis or evaluation of the code or software documentation against each standard or requirement document.

In block 418, the computing system 400 may perform the requested analysis or evaluation by prompting an LLM 420 to compare the entered organizational structures and/or business process documentation to the relevant standards, requirements and/or policy documents accessed/obtained in block 416. Depending on the type of requested analysis or evaluation, the prompted analysis performed in block 418 by the LLM 420 may involve comparing each aspect of the documentation being evaluated to each relevant standard or requirement to determine a degree of compliance or deviation. In some embodiments, this may be accomplished by leveraging the language processing capabilities of a general-language trained LLM to recognize similarities and differences in the language context and underlying meaning of the aspect of the document being evaluated compared to corresponding each relevant standard, requirement, or policy detail. In some embodiments, this may be accomplished using a second LLM 420, different from the first LLM 410, that is specially trained or fine-tuned to recognize similarities and differences in the language context and underlying meaning of the aspect of organizational structures and/or business process documents compared to relevant organizational structures and/or business process standard, requirement and/or policy details.

In addition to prompting or fine-tuning the LLM 420 to perform this aspect-by-aspect/requirement-by-requirement comparison, the LLM may be prompted in block 418 (or fine-tuned through training) to generate plain language text that identifies and explains the degree of compliance or deviation from each relevant standard, requirement and/or policy. The LLM 420 may be further prompted (or fine-tuned through training) to generate language explaining or recommending how the organizational structures and/or business process documentation could or should be redesigned or modified to achieve compliance when this comparison identifies a deviation from a standard, requirement, or policy. The results and recommendations language generated by the LLM 420 in block 418 may be temporarily stored in working memory (e.g., 213) for use in generating reports in block 422.

The operations of comparing aspects in the organizational structures and/or business process documents being evaluated to relevant standards, requirements and/or policies performed in block 418 may be repeated for each relevant standard, requirement, and policy document identified in block 414. In this manner, a complete standards/requirements/policy compliance evaluation spanning a number of a standards, requirements, and policies can be accomplished efficiently. By performing these analyses leveraging the language processing capabilities of the LLM 420, the computing system 200 may perform the types of analyses that teams of people would perform in a conventional compliance review process.

Finally, in block 422 the computing system 400 may generate a report and/or display of the results of the analysis or evaluation performed in block 418. For example, the natural language text generated by the LLM 420 in block 418 for each compliance and deviation conclusion, as well as generated recommendations, may be organized into a report for presentation to the user. In some embodiments, a generally-trained LLM may be prompted (e.g., by the evaluation controller 214) to output the combined results and recommendations according to a specified format, such as based on a supplied example or template. In some embodiments, a specially trained or fine-tuned LLM may be trained to output the combined results and recommendations in a format appropriate for organizational structures and/or business process documentation compliance reviews. Such reports may be generated to comply with content and format requirements specified by company policies and/or according to government or regulatory formats. The presentation of the generated reports to the user may be in the form of a visual display on the user's computer or workstation (e.g., via a user interface 202), and/or written documents that may be communicated to the user's computer or workstation (e.g., via an organizational structures and/or business process API 212) for storage, printing and/or communication by network to others.

As noted above, the computing system 204 may employ more than one LLM, such as a first LLM 410 used for analyzing text of organizational structures and/or business process documentation for the purposes of identifying concepts and/or elements for searching the compliance criteria vector database, and a second LLM 420 for conducting the compliance analysis or review of the documentation against relevant standards, requirements and/or policy documents. For this reason, the LLMs shown in FIG. 4 are labeled 410 and 420 to indicate that in some embodiments they may be different LLMs, while the LLM in FIG. 2 is labeled 216 to indicate that in some embodiments the same LLM may be employed for both operations.

FIG. 5 illustrates an example method for automatically evaluating organizational structures and/or business process documentation for compliance with relevant standards, requirements, and policies according to some embodiments. With reference to FIGS. 1-5, the method 500 may be implemented in a computing system (e.g., 200, 300) including a computing device (e.g., 301), in hardware (e.g., a processing system 302), in software (e.g., 306) executing in a processor (e.g., 302), or in a combination of a software-configured processor(s) and dedicated hardware that includes other individual components. Means for performing functions of the method 500 may include a computing system (e.g., 301) including a processing system (e.g., 302) coupled to memory (e.g., 304). In order to encompass the alternative configurations enabled in various embodiments, the hardware implementing the method 500 is referred to herein as a "computing device."

In block 502, the computing device may perform operations including receiving from a user interface one or more organizational structures and/or business process documents for evaluation and requested analysis or evaluation to be conducted on the one or more organizational structures and/or business process documents. Examples of the types of documentation that may be received in block 502 include business processes, business rules, organizational structures, responsibilities, communication protocols, and decision making standards and policies. As described, the one or more organizational structures and/or business process documents may be received in the native format used by business teams as an upload from a user's computer or workstation. To provide data security, in some embodiments operations in block 502 may include receiving information in encrypted format as the user interface may encrypt data and use secure user authentication methods, such as Oath or JSON Web Tokens for transmitting documents and analysis/evaluation requests to the computing device to prevent unauthorized access and ensure compliance with security regulations/requirements. In some embodiments, the computing device may also receive documents and information from various business tools and platforms commonly used by business teams.

In block 504, the computing device may perform operations including transforming the received request for analysis or evaluation and the one or more organizational structures and/or business process documents into a format suitable for processing by an LLM. For example, the computing device may reformat or translate data structures used in one programming language or protocol into a different data structure used in another language or protocol compatible with the LLM and other elements of the computing system. In some embodiments, the operations in block 504 may involve translating organizational structures and/or business process terminology and acronyms into natural language that is understandable by the LLM.

In block 506, the computing device may perform operations including prompting an LLM to process the one or more organizational structures and/or business process documents and the requested analysis or evaluation to identify (e.g., infer and output) concepts and/or elements that are likely to be a subject of a standard, requirement, or policy. For example, the computing device may prompt the LLM with one or more of the submitted organizational structures and/or business process documents along with the requested analysis or evaluation and instruct the LLM to evaluate the documents to identify particular aspects or features that are of a format or context that is typically addressed by standards, requirements and/or policies. In some embodiments, the operations in block 506 may include prompting a first LLM (e.g., 410) that is trained or fine-tuned to analyze organizational structures and/or business process documentation and the requested analysis or evaluation to identify concepts and/or elements in the organizational structures and/or business process that are likely to be a subject of a standard, requirement, or policy.

In block 508, the computing device may perform operations including reformatting the concepts and/or elements identified by the first LLM into a query format suitable for presenting to an organizational structures and/or business process standards, requirements, and policies compliance criteria vector database. For example, the computing device may translate the concepts and/or elements output by the LLM into formats, taxonomies, and vocabularies that are compatible with the standards and requirements of the organizational structures and/or business process domain of the compliance review and the compliance criteria vector database. In some embodiments, the computing device may perform operations including generating a query based on the concepts and/or elements output by the LLM that is consistent with terminology, acronyms and formats used in organizational structures and/or business process standards, requirements, and policy documents.

In block 510, the computing device may perform operations including submitting the query to the organizational structures and/or business process standards, requirements, and policies compliance criteria vector database to identify standards, requirements, or policies that are relevant to the requested analysis or evaluation. As part of the operations in block 510, the computing device may receive a response from the compliance criteria vector database providing a list of standard, requirement and/or policy documents that are relevant to the concepts and/or elements of the organizational structures and/or business process documentation. This list of relevant documents may include links or addresses that may be used to obtain each document from the standard, requirement, and policy documents repository (e.g., 222), or other sources (e.g., the Internet). In some embodiments, as part of the operations in block 510, the computing device may perform operations to access or otherwise obtain the identified relevant standards, requirements, or policies documents from the standard, requirement, and policy documents repository or other sources. In some embodiments, the computing device may access or obtain the identified relevant standards, requirements, or policies documents from the repository (or other sources) using the document links or addresses in the list provided by the organizational structures and/or business process standards, requirements, and policies compliance criteria vector database. The computing device may then use the obtained relevant documents for prompting the LLM.

In block 512, the computing device may perform operations including prompting the LLM to determine (e.g., infer and output) whether the one or more organizational structures and/or business process documents comply with each of the identified relevant standards, requirements, or policies. For example, the computing device may prompt the LLM to recognize similarities and differences in the language context and underlying meaning of the aspect of the document being evaluated compared to corresponding each relevant standard, requirement, or policy detail. In some embodiments, prompting the LLM to determine (e.g., infer and output) whether one or more organizational structures and/or business process documents comply with each of the identified relevant standards, requirements, or policies may involve the computing device prompting a second LLM (different from a first LLM) that is trained or fine-tuned to compare organizational structures and/or business process documentation to organizational structures and/or business process standards, requirements, and policies to identify areas of compliance and non-compliance. In some embodiments, the computing device may be configured to prompt the LLM or a second LLM to evaluate the organizational structures and business processes documents against security standards and requirements to conduct a security assessment or security standards review to assess security practices and protections implemented in the organizational structures and business processes.

In some embodiments, the operations in block 512 may include submitting each identified relevant standard, requirement, or policy document individually along with a prompt to determine (e.g., infer and output) whether the one or more organizational structures and/or business process documents comply with the submitted standard, requirement, or policy document. In some embodiments, the operations in block 512 may include submitting each standard, requirement, or policy document to the LLM in a manner that accommodates a token limitation of the LLM.

In some embodiments, the operations in block 512 may include prompting the LLM to output text identifying aspects of the one or more organizational structures and/or business process documents that comply with the identified relevant standards, requirements, or policies, and also output text identifying non-compliant aspects of the one or more organizational structures and/or business process documents along with recommended changes to comply with the identified relevant standards, requirements, or policies. In some embodiments, the operations in block 512 may include prompting the LLM to output text suggesting improvements to the organizational structures and/or business process documentation to comply with relevant standards, requirements, or policies while complying with specific business requirements or constraints. Such prompts may direct the LLM to include excerpts from standards, requirements, policies addressing compliance or non-compliance, as well as the rationale for applying particular standards, requirements, policies to the documentation.

In some embodiments, the operations in block 512 may address ambiguous or open-to-interpretation standards, requirements, and/or policies by consulting additional sources of information (e.g., via searches of other databases accessible by the computing system or an Internet search), soliciting expert opinions, and/or using domain-specific knowledge of the LLM to arrive at an understanding and proper application to the organizational structures and/or business process documentation. For example, if a business document or requested evaluation contains ambiguous information, the computing system may refer to relevant industry standards for guidance on best practices. If no directives apply to address conflicting or missing information, the LLM may provide an answer even if the information available to the LLM is not perfect or complete.

In block 514, the computing device may perform operations including generate a report including determinations, inferences or outputs of the LLM regarding compliance of the one or more organizational structures and/or business process documents with each of the identified relevant standards, requirements, or policies. In some embodiments, the operations in block 514 may include the computing device outputting a security compliance assessment of the organizational structures and business processes. In some embodiments, the operations in block 514 may include the computing device organizing the compliance, non-compliance, and improvement suggestion outputs of the LLM into a report format that is predefined, such as complying with a department, company, client, or agency format specification. The operations in block 514 may include generating a visual display on the user's computer or workstation and/or producing written documents that may be communicated to the user's computer or workstation for storage, printing and/or communication by network to others. In some embodiments, the operations in block 514 may include the computing device outputting reports in a format (e.g., a structure or process schema) suitable for communication directly to another computing system, such as to support automated processes (e.g., CI/CD).

Figure 6:
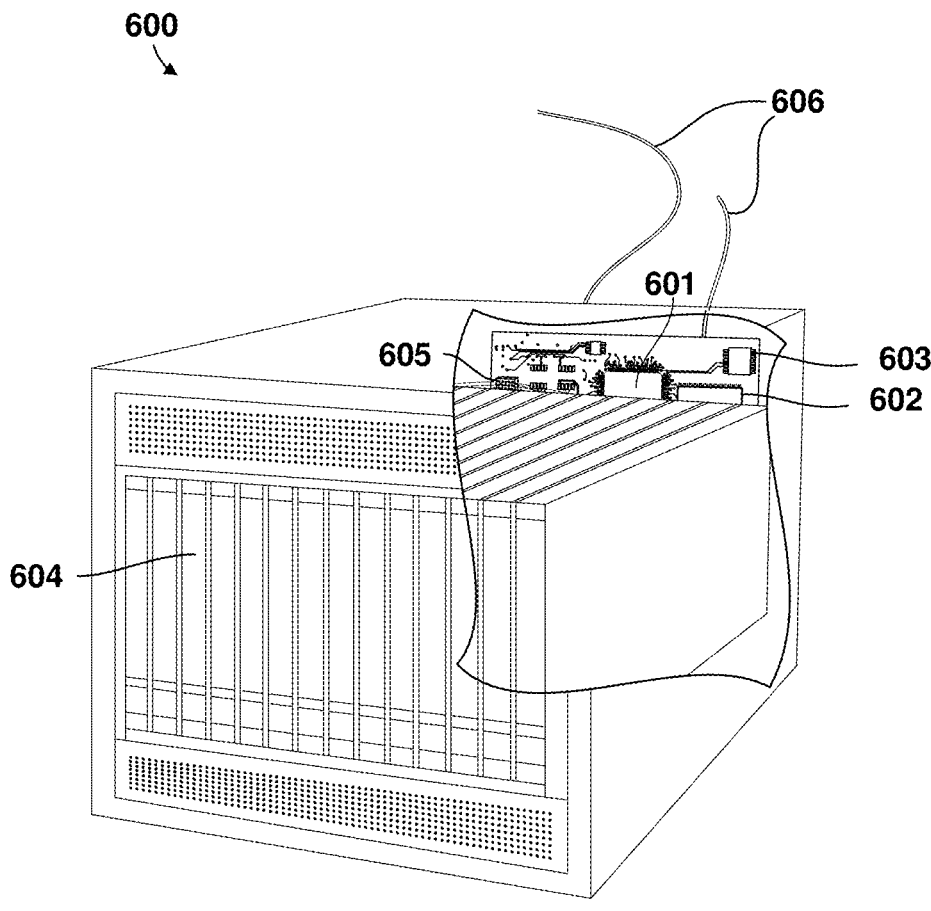
FIG. 6 is a component block diagram illustrating an example server computing system suitable for implementing various embodiments.

Various embodiments (including, but not limited to, embodiments described above with reference to FIGS. 2-5) may be implemented in fixed computing systems, such as any of a variety of generalized or specialize computing systems, an example of which in the form of a server computing system 600 is illustrated in FIG. 6. A server computing system 600 typically includes one or more multicore processor systems 601 coupled to volatile memory 602 and a large capacity nonvolatile memory, such as a non-volatile disk drive 604. The processing systems 601 may include or be coupled to specialized processors 603 configured to perform calculations involved in neural network processing and machine learning such as graphical processing units (GPU), neural network processors and the like. In some implementations, multiple processing system and memory units 604 may be implemented within the computing system 600, such as to permit parallel processing and segmented processing of input data (e.g., image datasets) according to various embodiments. The server computing system 600 may also include network access ports 605 coupled to the multicore processor assemblies 601 for establishing network interface connections with a network 606, such as a local area network, the Internet, and other networks, such as for sending prompts to and receiving responses from a remotely deployed LLM.

Implementation examples are described in the following paragraphs. While some of the following implementation examples are described in terms of example methods, further example implementations may include the example methods discussed in the following paragraphs implemented by a computing device such as a server including a processor configured with processor-executable instructions to perform operations of the methods of the following implementation examples; example methods discussed in the following paragraphs implemented by a server including means for performing functions of the methods of the following implementation examples; and example methods discussed in the following paragraphs may be implemented as a non-transitory processor-readable storage medium having stored thereon processor-executable instructions configured to cause a server to perform the operations of the methods of the following implementation examples.

Example 1. A computer-implemented method of evaluating application organizational structures and/or business process documentation against relevant standards, requirements, or policies, including: receiving from a user interface one or more organizational structures and/or business process documents for evaluation and requested analysis or evaluation to be conducted on the one or more organizational structures and/or business process documents; transforming the received request for analysis or evaluation and the one or more organizational structures and/or business process documents into a format suitable for processing by a large language model (LLM); prompting an LLM to process the one or more organizational structures and/or business process documents and the requested analysis or evaluation to identify (e.g., infer and output) concepts and/or elements that are likely to be a subject of a standard, requirement, or policy; reformatting the concepts and/or elements identified by the first LLM into a query format suitable for presenting to an organizational structures and/or business process standards, requirements, and policies compliance criteria vector database; submitting the query to the organizational structures and/or business process standards, requirements, and policies compliance criteria vector database to identify standards, requirements, or policies that are relevant to the requested analysis or evaluation; prompting the LLM to determine (e.g., infer and output) whether the one or more organizational structures and/or business process documents comply with each of the identified relevant standards, requirements, or policies; and generating and outputting a report including determinations, inferences or outputs of the LLM regarding compliance of the one or more organizational structures and/or business process documents with each of the identified relevant standards, requirements, or policies.

Example 2. The computer-implemented method of claim 1, in which transforming the received request for analysis or evaluation and the one or more organizational structures and/or business process documents into a format suitable for processing by a LLM includes translating organizational structures and/or business process terminology and acronyms into natural language understandable by the LLM.

Example 3. The computer-implemented method of claim 1, in which: prompting an LLM to process the one or more organizational structures and/or business process documents and the requested analysis or evaluation to identify (e.g., infer and output) concepts and/or elements that are likely to be a subject of a standard, requirement or policy includes prompting a first LLM that is trained to analyze organizational structures and/or business process documentation and the requested analysis or evaluation to identify organizational structures and/or business process concepts and/or elements that that are likely to be a subject of a standard, requirement or policy; and prompting the LLM to determine (e.g., infer and output) whether the one or more organizational structures and/or business process documents comply with each of the identified relevant standards, requirements, or policies includes prompting a second LLM that is trained to compare organizational structures and/or business process documentation to organizational structures and/or business process standards, requirements, and policies to identify compliance and non-compliance.

Example 4. The computer-implemented method of claim 1, in which prompting the LLM to determine (e.g., infer and output) whether the one or more organizational structures and/or business process documents comply with each of the identified relevant standards, requirements, or policies includes prompting the LLM to: output text identifying aspects of the one or more organizational structures and/or business process documents that comply with the identified relevant standards, requirements, or policies;

and output text identifying non-compliant aspects of the one or more organizational structures and/or business process documents along with recommended changes to comply with the identified relevant standards, requirements, or policies.

Example 5. The computer-implemented method of claim 1, in which reformatting the concepts and/or elements identified by the LLM into a query suitable for presenting to an organizational structures and/or business process standards, requirements and policies compliance criteria vector database includes generating a query based on the concepts and/or elements identified by the LLM that is consistent with terminology, acronyms and formats used in organizational structures and/or business process standards, requirements and policy documents.

Example 6. The computer-implemented method of claim 1, further including accessing identified relevant standards, requirements, or policies documents, in which prompting the LLM to determine (e.g., infer and output) whether the one or more organizational structures and/or business process documents comply with each of the identified relevant standards, requirements, or policies includes submitting each identified relevant standard, requirement, or policy document to the LLM individually along with a prompt to determine (e.g., infer and output) whether the one or more organizational structures and/or business process documents comply with the submitted standard, requirement, or policy document.

Example 7. The computer-implemented method of claim 6, further including submitting each standard, requirement, or policy document to the LLM in a manner that accommodates a token limitation of the LLM.

Example 8. The computer-implemented method of claim 1, further including using document links provided by the organizational structures and/or business process standards, requirements, and policies compliance criteria vector database with the identified relevant standards, requirements, or policies to obtain the relevant software standards, requirements and policy documents from a standards, requirements, and policy repository for use in prompting the LLM.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing system diagrams, method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A computer-implemented method of evaluating application organizational structures or business process documentation against pertinent standards, requirements, or policies, comprising:

receiving from a user interface one or more organizational structures or business process documents for evaluation and requested analysis or evaluation to be conducted on the one or more organizational structures or business process documents;

transforming the received request for analysis or evaluation and the one or more organizational structures or business process documents into a format suitable for processing by a large language model (LLM);

prompting a first LLM, which is trained to analyze organizational structures or business process documentation and the requested analysis or evaluation to identify organizational structures or business process concepts or elements that correspond to a standard, requirement or policy, to process the one or more organizational structures or business process documents and the requested analysis or evaluation to identify concepts or elements that are a subject of a standard, requirement, or policy;

reformatting, using a compliance criteria vector database query interface module, the concepts or elements identified by the first LLM into a query format suitable for presenting to an organizational structures or business process standards, requirements, and policies compliance criteria vector database, wherein the compliance criteria vector database query interface module is configured to translate the natural language concepts or elements identified by the first LLM into terminology and format compatible with the compliance criteria vector database, thereby enabling the use of a general language LLM to work with standards, requirements, and policies unique to the domain of the compliance evaluation without requiring a specialized LLM trained specifically for the domain;

submitting the query to the organizational structures or business process standards, requirements, and policies compliance criteria vector database to identify standards, requirements, or policies that pertain to the requested analysis or evaluation;

prompting a second LLM, which is trained to compare organizational structures or business process documentation to organizational structures or business process standards, requirements, and policies to identify compliance and non-compliance, to determine whether the one or more organizational structures or business process documents comply with each of the identified pertinent standards, requirements, or policies; and generating a report comprising outputs of the second LLM regarding compliance of the one or more organizational structures or business process documents with each of the identified pertinent standards, requirements, or policies.

2. The computer-implemented method of claim 1, wherein transforming the received request for analysis or evaluation and the one or more organizational structures or business process documents into a format suitable for processing by a LLM comprises translating organizational structures or business process terminology and acronyms into natural language understandable by the first LLM.

3. The computer-implemented method of claim 1, wherein prompting the second LLM to determine whether the one or more organizational structures or business process documents comply with each of the identified pertinent standards, requirements, or policies comprises prompting the second LLM to:

output text identifying aspects of the one or more organizational structures or business process documents that comply with the identified pertinent standards, requirements, or policies; and output text identifying non-compliant aspects of the one or more organizational structures or business process documents along with recommended changes to comply with the identified pertinent standards, requirements, or policies.

4. The computer-implemented method of claim 1, wherein reformatting the concepts or elements identified by the first LLM into a query suitable for presenting to an organizational structures or business process standards, requirements and policies compliance criteria vector database comprises generating a query based on the concepts or elements identified by the first LLM that is consistent with terminology, acronyms and formats used in organizational structures or business process standards, requirements and policy documents.

5. The computer-implemented method of claim 1, further comprising accessing identified pertinent standards, requirements, or policies documents, wherein prompting the second LLM to determine whether the one or more organizational structures or business process documents comply with each of the identified pertinent standards, requirements, or policies comprises submitting each identified pertinent standard, requirement, or policy document to the second LLM individually along with a prompt to determine whether the one or more organizational structures or business process documents comply with the submitted standard, requirement, or policy document.

6. The computer-implemented method of claim 5, further comprising submitting each standard, requirement, or policy document to the second LLM in a manner that accommodates a token limitation of the second LLM.

7. The computer-implemented method of claim 1, further comprising using document links provided by the organizational structures or business process standards, requirements, and policies compliance criteria vector database with the identified pertinent standards, requirements, or policies to obtain the pertinent software standards, requirements and policy documents from a standards, requirements, and policy repository for use in prompting the first LLM.

8. A computer system configured for evaluating application organizational structures or business process documentation against pertinent standards, requirements, or policies, comprising:

a memory; and one or more computing devices coupled to the memory and configured with computer-executable instructions to perform operations comprising:

receiving from a user interface one or more organizational structures or business process documents for evaluation and requested analysis or evaluation to be conducted on the one or more organizational structures or business process documents;

transforming the received request for analysis or evaluation and the one or more organizational structures or business process documents into a format suitable for processing by a large language model (LLM);

prompting a first LLM, which is trained to analyze organizational structures or business process documentation and the requested analysis or evaluation to identify organizational structures or business process concepts or elements that correspond to a standard, requirement or policy, to process the one or more organizational structures or business process documents and the requested analysis or evaluation to identify concepts or elements that are a subject of a standard, requirement, or policy;

reformatting, using a compliance criteria vector database query interface module, the concepts or elements identified by the first LLM into a query suitable for presenting to an organizational structures or business process standards, requirements, and policies compliance criteria vector database, wherein the compliance criteria vector database query interface module is configured to translate the natural language concepts or elements identified by the first LLM into terminology and format compatible with the compliance criteria vector database, thereby enabling the use of a general language LLM to work with standards, requirements, and policies unique to the domain of the compliance evaluation without requiring a specialized LLM trained specifically for the domain;

submitting the query to the organizational structures or business process standards, requirements, and policies compliance criteria vector database to identify standards, requirements, or policies that pertain to the requested analysis or evaluation;

prompting a second LLM, which is trained to compare organizational structures or business process documentation to organizational structures or business process standards, requirements, and policies to identify compliance and non-compliance, to determine whether the one or more organizational structures or business process documents comply with each of the identified pertinent standards, requirements, or policies; and generating a report comprising outputs of the second LLM regarding compliance of the one or more organizational structures or business process documents with each of the identified pertinent standards, requirements, or policies.

9. The computer system of claim 8, wherein the one or more computing devices are further configured with computer-executable instructions to perform operations such that transforming the received request for analysis or evaluation and the one or more organizational structures or business process documents into a format suitable for processing by an LLM comprises translating organizational structures or business process terminology and acronyms into natural language understandable by the first LLM.

10. The computer system of claim 8, wherein one or more computing devices are further configured with computer-executable instructions to perform operations such that prompting the second LLM to determine whether the one or more organizational structures or business process documents comply with each of the identified pertinent standards, requirements, or policies comprises prompting the second LLM to:

output text identifying aspects of the one or more organizational structures or business process documents that comply with the identified pertinent standards, requirements, or policies; and output text identifying non-compliant aspects of the one or more organizational structures or business process documents along with recommended changes to comply with the identified pertinent standards, requirements, or policies.

11. The computer system of claim 8, wherein one or more computing devices are further configured with computer-executable instructions to perform operations such that reformatting the concepts or elements identified by the first LLM into a query suitable for presenting to an organizational structures or business process standards, requirements and policies compliance criteria vector database comprises generating a query based on the concepts or elements identified by the first LLM that is consistent with terminology, acronyms and formats used in organizational structures or business process standards, requirements and policy documents.

12. The computer system of claim 8, wherein one or more computing devices are further configured with computer-executable instructions to perform operations further comprising accessing identified pertinent standards, requirements, or policies documents, wherein prompting the second LLM to determine whether the one or more organizational structures or business process documents comply with each of the identified pertinent standards, requirements, or policies comprises submitting each identified pertinent standard, requirement, or policy document to the second LLM individually along with a prompt to determine whether the one or more organizational structures or business process documents comply with the submitted standard, requirement, or policy document.

13. The computer system of claim 12, wherein one or more computing devices are further configured with computer-executable instructions to perform operations further comprising submitting each standard, requirement, or policy document to the second LLM in a manner that accommodates a token limitation of the second LLM.

14. The computer system of claim 8, wherein one or more computing devices are further configured with computer-executable instructions to perform operations further comprising using document links provided by the organizational structures or business process standards, requirements, and policies compliance criteria vector database with the identified pertinent standards, requirements, or policies to obtain the pertinent software standards, requirements and policy documents from a standards, requirements and policy repository for use in prompting the second LLM.

15. The computer system of claim 8, wherein the user interface is a machine interface configured to receive inputs and directions from another computer.

16. A non-transitory computer-readable medium having stored thereon computer-executable instructions configured to cause one or more computing devices of a computing system to perform operations comprising:

receiving from a user interface one or more organizational structures or business process documents for evaluation and requested analysis or evaluation to be conducted on the one or more organizational structures or business process documents;

transforming the received request for analysis or evaluation and the one or more organizational structures or business process documents into a format suitable for processing by a large language model (LLM);

prompting a first LLM, which is trained to analyze organizational structures or business process documentation and the requested analysis or evaluation to identify organizational structures or business process concepts or elements that correspond to a standard, requirement or policy, to process the one or more organizational structures or business process documents and the requested analysis or evaluation to identify concepts or elements that are a subject of a standard, requirement, or policy;

reformatting, using a compliance criteria vector database query interface module, the concepts or elements identified by the first LLM into a query suitable for presenting to an organizational structures or business process standards, requirements, and policies compliance criteria vector database, wherein the compliance criteria vector database query interface module is configured to translate the natural language concepts or elements identified by the first LLM into terminology and format compatible with the compliance criteria vector database, thereby enabling the use of a general language LLM to work with standards, requirements, and policies unique to the domain of the compliance evaluation without requiring a specialized LLM trained specifically for the domain;

submitting the query to the organizational structures or business process standards, requirements, and policies compliance criteria vector database to identify standards, requirements, or policies that pertain to the requested analysis or evaluation;

prompting a second LLM, which is trained to compare organizational structures or business process documentation to organizational structures or business process standards, requirements, and policies to identify compliance and non-compliance, to determine whether the one or more organizational structures or business process documents comply with each of the identified pertinent standards, requirements, or policies; and generating and outputting a report comprising outputs of the second LLM regarding compliance of the one or more organizational structures or business process documents with each of the identified pertinent standards, requirements, or policies.

17. The non-transitory computer-readable medium of claim 16, wherein the stored computer-executable instructions are configured to cause one or more computing devices of the computing system to perform operations such that transforming the received request for analysis or evaluation and the one or more organizational structures or business process documents into a format suitable for processing by an LLM comprises translating organizational structures or business process terminology and acronyms into natural language understandable by the first LLM.

18. The non-transitory computer-readable medium of claim 16, wherein the stored computer-executable instructions are configured to cause one or more computing devices of the computing system to perform operations such that prompting the second LLM to determine whether the one or more organizational structures or business process documents comply with each of the identified pertinent standards, requirements, or policies comprises prompting the second LLM to:

output text identifying aspects of the one or more organizational structures or business process documents that comply with the identified pertinent standards, requirements, or policies; and output text identifying non-compliant aspects of the one or more organizational structures or business process documents along with recommended changes to comply with the identified pertinent standards, requirements, or policies.

19. The non-transitory computer-readable medium of claim 16, wherein the stored computer-executable instructions are configured to cause one or more computing devices of the computing system to perform operations such that reformatting the concepts or elements identified by the first LLM into a query suitable for presenting to an organizational structures or business process standards, requirements and policies compliance criteria vector database comprises generating a query based on the concepts or elements identified by the first LLM that is consistent with terminology, acronyms and formats used in organizational structures or business process standards, requirements and policy documents.

20. The non-transitory computer-readable medium of claim 16, wherein the stored computer-executable instructions are configured to cause one or more computing devices of the computing system to perform operations further comprising accessing identified pertinent standards, requirements, or policies documents, wherein prompting the second LLM to determine whether the one or more organizational structures or business process documents comply with each of the identified pertinent standards, requirements, or policies comprises submitting each identified pertinent standard, requirement, or policy document to the second LLM individually along with a prompt to determine whether the one or more organizational structures or business process documents comply with the submitted standard, requirement, or policy document.

21. The non-transitory computer-readable medium of claim 20, wherein the stored computer-executable instructions are configured to cause one or more computing devices of the computing system to perform operations further comprising submitting each standard, requirement, or policy document to the second LLM in a manner that accommodates a token limitation of the second LLM.

22. The non-transitory computer-readable medium of claim 16, wherein the stored computer-executable instructions are configured to cause one or more computing devices of the computing system to perform operations further comprising using document links provided by the organizational structures or business process standards, requirements, and policies compliance criteria vector database with the identified pertinent standards, requirements, or policies to obtain the pertinent software standards, requirements and policy documents from a standards, requirements and policy repository for use in prompting the second LLM.

* * * * *